United States Patent
Fujibayashi et al.

(10) Patent No.: US 9,417,761 B2
(45) Date of Patent: Aug. 16, 2016

(54) STORAGE MEDIUM STORING IMAGE PROCESSING PROGRAM, IMAGE PROCESSING APPARATUS, IMAGE PROCESSING METHOD AND IMAGE PROCESSING SYSTEM FOR DISPLAYING A VIRTUAL SPACE IN WHICH OBJECTS ARE ARRANGED WITH A VIRTUAL CAMERA

(75) Inventors: Hidemaro Fujibayashi, Kyoto (JP); Yutaka Hiramuki, Kyoto (JP); Ryo Tanaka, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 559 days.

(21) Appl. No.: 13/209,689

(22) Filed: Aug. 15, 2011

(65) Prior Publication Data

US 2012/0308078 A1 Dec. 6, 2012

(30) Foreign Application Priority Data

Jun. 2, 2011 (JP) .................... 2011-124530

(51) Int. Cl.
*G06K 9/00* (2006.01)
*G06F 3/0481* (2013.01)
*A63F 13/525* (2014.01)
*G06F 3/0346* (2013.01)
(Continued)

(52) U.S. Cl.
CPC ............ *G06F 3/04815* (2013.01); *A63F 13/04* (2013.01); *A63F 13/10* (2013.01); *A63F 13/525* (2014.09); *G06F 3/0346* (2013.01); *A63F 2300/305* (2013.01); *A63F 2300/306* (2013.01); *A63F 2300/308* (2013.01); *A63F 2300/6676* (2013.01)

(58) Field of Classification Search
CPC . G06K 9/00791; G06K 9/3241; G06T 7/0075
USPC ............ 345/173, 419, 592, 632, 672; 463/31, 463/32, 43; 702/93
See application file for complete search history.

(56) References Cited

U.S. PATENT DOCUMENTS 6,424,353 B2   7/2002  Yamamoto et al.
7,227,526 B2 *  6/2007  Hildreth et al. ............... 345/156
(Continued)

FOREIGN PATENT DOCUMENTS

JP    11-235466    8/1999
JP    2010-012041  1/2010
(Continued)

OTHER PUBLICATIONS

Office Action (3 pages) dated Feb. 24, 2015, issued in corresponding Japanese Application No. 2011-124530 and English translation (3 pages).

(Continued)

*Primary Examiner* — Vikkram Bali
*Assistant Examiner* — Xuemei Chen
(74) *Attorney, Agent, or Firm* — Nixon & Vanderhye P.C.

(57) ABSTRACT

An image processing apparatus writes a virtual space image obtained by imaging a virtual space in which objects are arranged from a virtual camera to an output area. When a pointer image representing a positional relationship between a referential position and an arrangement position of the object is depicted on the virtual space image stored in the output area, the pointer image to be depicted is changed in correspondence with conditions, such as the height of the virtual camera and the attribute of the object.

23 Claims, 18 Drawing Sheets

(51) Int. Cl.
*A63F 13/219* (2014.01)
*A63F 13/40* (2014.01)

(56) References Cited

U.S. PATENT DOCUMENTS

| | | | |
|---|---|---|---|
| 7,538,775 B2 * | 5/2009 | Ishihara | 345/592 |
| 8,306,768 B2 * | 11/2012 | Yamada et al. | 702/93 |
| 8,308,560 B2 | 11/2012 | Tawara et al. | |
| 8,337,313 B2 * | 12/2012 | Yamada et al. | 463/43 |
| 8,403,749 B2 * | 3/2013 | Yoshikawa et al. | 463/31 |
| 8,427,506 B2 * | 4/2013 | Kato | 345/632 |
| 8,430,751 B2 * | 4/2013 | Yamada et al. | 463/31 |
| 8,460,100 B2 * | 6/2013 | Matsumiya et al. | 463/32 |
| 8,493,382 B2 * | 7/2013 | Ohta | 345/419 |
| 8,523,683 B2 * | 9/2013 | Aoyagi et al. | 463/43 |
| 8,529,355 B2 * | 9/2013 | Hiratake et al. | 463/43 |
| 8,651,952 B2 * | 2/2014 | Dohta | A63F 13/02 463/36 |
| 8,888,594 B2 | 11/2014 | Hiratake et al. | |
| 2002/0024517 A1 * | 2/2002 | Yamaguchi et al. | 345/424 |
| 2006/0135256 A1 | 6/2006 | Toyama | |
| 2007/0207856 A1 * | 9/2007 | Sato | 463/32 |
| 2008/0119269 A1 * | 5/2008 | Nonaka et al. | 463/32 |
| 2010/0001952 A1 | 1/2010 | Hiratake et al. | |
| 2010/0069159 A1 * | 3/2010 | Yamada et al. | 463/43 |
| 2010/0248836 A1 * | 9/2010 | Suzuki | A63F 13/00 463/36 |
| 2010/0315352 A1 * | 12/2010 | Hamamura et al. | 345/173 |
| 2012/0306854 A1 * | 12/2012 | Yamada | G06T 19/20 345/419 |
| 2013/0321472 A1 * | 12/2013 | Piemonte et al. | 345/672 |
| 2013/0324253 A1 | 12/2013 | Hiratake et al. | |

FOREIGN PATENT DOCUMENTS

| | | |
|---|---|---|
| JP | 2010-262523 | 11/2010 |
| WO | WO 2004/110577 | 12/2004 |

OTHER PUBLICATIONS

Imasugukaeru! Game Information Pokémon HeartGold and SoulSilver, 24$^{th}$ vol., 43$^{rd}$ issue of Weekly Famitsu, Japan, published by Enterbrain, Inc. Oct. 15, 2009 pp. 128-133 with partial translation (7 pages).

Pokémon HG SS Choukouryaju! Tobikkiri Pokeneta 100 renpatsu!, Monthly Pokémon Kanzenseiha Book, vol. 2, supplement No. 2 to December issue of Dengeki Nintendo DS, Japan, published by ASCII Media Works on Dec. 1, 2009, 2$^{nd}$ vol. p. 24 with partial translation (10 pages).

* cited by examiner (A)

(B)

(A)

(B)

(A)

SURFACE (Sf) HEIGHT
INFORMATION :
HEIGHT (H1, H2) OF AREAS (A1, A2)
DEFINED BY TAGS (Tg1, Tg2)

(B)

REFERENTIAL POSITION INFORMATION :
POSITION(P) & HEIGHT(H) OF VIRTUAL CAMERA IC

POSITIONAL INFORMATION OF OBJECT
(Ob1, Ob2, ⋯) : P1, P2, ⋯

(A) IN CASE OF PLURALITY OF OBJECTS TO BE DETECTED

STRENGTH OF DETECTION : Ob2>Ob1>Ob3 (>0=Ob4=Ob5)
- EXCLUDE OBJECT (Ob4,Ob5) BING OUT OF DETECTION RANGE
- GIVE PRIORITY TO OBJECT (Ob1,Ob2) HAVING SAMLL DISTANCE d WITHIN DETECTION RANGE
- GIVE PRIORITY TO OBJECT (Ob2) HAVING SAMLL ANGLE θ IF DISTANCE IS EQUAL (B) DECISION OF TOP-PRIORITY OBJECT
Obi←Ob2
di←d2
θi←θ2

STORAGE MEDIUM STORING IMAGE PROCESSING PROGRAM, IMAGE PROCESSING APPARATUS, IMAGE PROCESSING METHOD AND IMAGE PROCESSING SYSTEM FOR DISPLAYING A VIRTUAL SPACE IN WHICH OBJECTS ARE ARRANGED WITH A VIRTUAL CAMERA

CROSS REFERENCE OF RELATED APPLICATION

The disclosure of Japanese Patent Application No. 2011-124530 filed on Jun. 2, 2011 is incorporated herein by reference.

BACKGROUND OF EXAMPLE EMBODIMENTS OF THE INVENTION

1. Field of Example Embodiments of the Invention

Example embodiments of the present invention relate to a storage medium storing an image processing program, image processing apparatus, image processing method and image processing system. More specifically, example embodiments of the present invention relate to an image processing program, image processing apparatus, image processing method and image processing system which displays an image obtained by imaging a virtual space in which objects are arranged with a virtual camera.

2. Description of the Related Art

Conventionally, in a technique of displaying an image obtained by imaging a virtual space in which objects are arranged with a virtual camera, a method of sending a notice of a distance from a predetermined position to an object and the direction thereof is known.

For example, according to the disclosure in the international publication WO2004/110577, a main video image including a video image from a viewpoint of a main character to be operated by a player in the virtual space is displayed on a display, and whether or not another sub characters exists is detected with reference to the gazing direction of the main character. If the existence of a sub character is detected, a sub video image being a video image from the viewpoint of the sub character is displayed, and if the existence of a sub character is not detected, a noise video image is displayed as a sub video image. Furthermore, depending on the distance between the main character and the sub characters, execution of further image processing on the sub video image or voice is also disclosed. More specifically, the closer the distance is, the higher the sharpness of the sub-video image is and the higher the voice is while the further the distance is, the lower the sharpness of the sub-video image is, and the lower the voice is.

SUMMARY OF EXAMPLE EMBODIMENTS OF THE INVENTION

In the patent document 1, on the basis of the distance between the main character and the sub characters, and the directions thereof, the display manner and the loudness of the voice of the sub video image are uniquely decided, resulting in lack of the degree of flexibility.

Therefore, example embodiments of the present invention provide a novel storage medium storing a novel image processing program, image processing apparatus, image processing method and image processing system.

Example embodiments of the present invention also provide a novel storage medium storing a novel image processing program, image processing apparatus, image processing method and image processing system which has high degree of flexibility.

Example embodiments of the present invention also provide a storage medium storing an image processing program, image processing apparatus, image processing method and image processing system which is able to dynamically send a notice of relation information indicating the relationship between a predetermined position and an object position.

Example embodiments of the present invention adopt following configurations in order to solve the aforementioned problems.

A first invention is a storage medium storing an image processing program, wherein the image processing program causes a computer of an image processing apparatus to function as: an image outputter which outputs a virtual space image obtained by imaging a virtual space in which objects are arranged with a virtual camera; a positional relationship information outputter which outputs positional relationship information indicating a positional relationship between a predetermined referential position and an arrangement position of the object; and a positional relationship information changer which changes the positional relationship information according to a condition.

According to the first invention, the information indicating the positional relationship between the referential position and the arrangement position of the object is changed according to a condition, and therefore, it is possible to dynamically send a notice of the positional relationship information depending on the state of the referential position. Accordingly, the degree of flexibility is heightened.

A second invention is a storage medium storing an image processing program according to the first invention, wherein the condition is a parameter set in association with the referential position.

According to the second invention, it is possible to change the positional relationship information by the parameter in association with the referential position.

A third invention is a storage medium storing an image processing program according to the second invention, wherein the parameter is height information defining a height from a reference level of the referential position.

According to the third invention, it is possible to change the positional relationship information depending on the height of the referential position.

A fourth invention is a storage medium storing an image processing program according to the third invention, wherein the image processing program causes the computer to further function as a range controller which sets a range detectable of existence of the object in association with the referential position and changes the range depending on at least the height information, and the positional relationship information is information at least indicating whether or not the arrangement position of the object is within the range.

According to the fourth invention, it is possible to dynamically change the object detectable range depending on the height information of the referential position, and it is possible to present to the player whether or not to be within the range by the positional relationship information.

A fifth invention is a storage medium storing an image processing program according to the fourth invention, wherein the range controller enlarges the range as a value indicated by the height information is large.

According to the fifth invention, as the height of the referential position is high, the detectable range is enlarged, allowing easy detection.

A sixth invention is a storage medium storing an image processing program according to the fourth invention, wherein the range is set on the basis of a distance and a direction from the referential position.

According to the sixth invention, the range relating to the positional relationship information can be set on the basis of the distance and the direction from the referential position. In one embodiment, the range is set as a cone-shaped area.

A seventh invention is a storage medium storing an image processing program according to the sixth invention, wherein the positional relationship information includes information indicating strength of detection of the object, and the range controller divides the range into a plurality of areas so as to change the strength of the detection step by step within the range.

In the seventh invention, in addition to the determination whether or not to be within the range, the strength of the detection within the range is represented step by step according to the positional relationship information. Accordingly, it is possible to send a notice of the positional relationship in detail.

An eighth invention is a storage medium storing an image processing program according to the sixth invention, wherein the image processing program causes the computer to further function as a calculator which calculates the strength of the detection on the basis of the distance from the referential position to the arrangement position of the object and the direction, and the positional relationship information changer changes the positional relationship information on the basis of a calculation result by the calculator in a case that the arrangement position of the object is within the range.

In the eighth invention, the strength of the detection is calculated on the basis of the distance and the direction. Then, in addition to the determination whether within the range or not, the strength of the detection within the range is represented by the result of the calculation by the positional relationship information, and therefore, it is possible to make a notice of the positional relationship in detail.

A ninth invention is a storage medium storing an image processing program according to the eighth invention, wherein the calculator makes calculation by giving a high priority to the distance than to the direction.

In one embodiment, a calculation is performed on the basis of the distance, and if the distance is equal to each other, the direction is taken into consideration, but in another embodiment, the calculation may be performed in a calculating method of assigning weights to the distance rather than the direction, for example.

According to the ninth invention, it is possible to represent a sense of distance to the object.

A tenth invention is a storage medium storing an image processing program according to the fourth invention, wherein the image processing program causes the computer to further function as a top-priority object decider which decides a top-priority object on the basis of the distance from the referential position to each object and the direction in a case that a plurality of objects exist within the range, and the positional relationship information indicates the relationship with the top-priority object.

In the tenth invention, in a case that there are a plurality of objects within the range, the top-priority object is decided on the basis of the distance and the direction, and by the positional relationship information, the relationship with the top-priority object is presented, and therefore, it is possible to detect the object closest to the referential position (from the closest object in order).

An eleventh invention is a storage medium storing an image processing program according to the tenth invention, wherein the top-priority object decider makes a decision by giving a high priority to the distance than to the direction.

In one embodiment, the decision is performed on the basis of the distance, and if the distance is equal to each other, the direction is taken into consideration, but in another embodiment, the decision may be performed in an algorithm of assigning weights to the distance rather than the direction, for example.

According to the eleventh invention, it is possible to represent the distance to the closest object.

A twelfth invention is a storage medium storing an image processing program according to the fourth invention, wherein the condition is an attribute set to the object.

In the twelfth invention, it is possible to dynamically change the positional relationship information in correspondence with the attribute of the object, capable of heightening the degree of flexibility.

A thirteenth invention is a storage medium storing an image processing program according to the twelfth invention, wherein the attribute includes information indicating whether or not the object is a movable object, and the image processing program causes the computer to further function as a range controller which sets a range detectable of existence of the object in association with the referential position and changes the range in correspondence with at least the attribute. More preferably, the area is enlarged as the object is an object moving largely (fast).

According to the thirteenth invention, as to the moving object, the range is enlarged to make it easy to find it.

In a modified example, information relating to a size is included in the attribute. For example, in a case that the object is large in size, the range may be set to be enlarged to make it easy to find it. More preferably, the area is enlarged as the object is larger in size. In another modified example, information relating to rarity is included in the attribute. In a case that the rarity of the object is high, the range may be reduced to thereby make it difficult to find it. More preferably, the range is reduced as the object is an object higher in rarity.

A fourteenth invention is a storage medium storing an image processing program according to the first invention, wherein the referential position is a position of the virtual camera, and the positional relationship information is represented by any one of at least an image, sound, vibrations and light emission.

According to the fourteenth invention, by any one of at least the sense of sight, the sense of hearing and the sense of touch, it is possible to make the user recognize the positional relationship.

A fifteenth invention is a storage medium storing an image processing program according to the fourteenth invention, wherein the positional relationship information outputter depicts the positional relationship information indicated by the image on the virtual space image.

In the fifteenth invention, it becomes possible to intuitively recognize the positional relationship by the sense of sight.

A sixteenth invention is a storage medium storing an image processing program according to the fourteenth, wherein the image processing program causes the computer to further function as a virtual camera position controller which controls the position of the virtual camera on the basis of an input from a pointing device.

A seventeenth invention is a storage medium storing an image processing program according to the fifteenth invention, wherein the positional relationship information outputter controls the positional relationship information represented by the image such that it directs to the object.

According to the sixteenth and seventeenth inventions, it is possible to make the player feel a sense as if he or she searches for the object in the virtual space with the pointing device.

An eighteenth invention is an image processing apparatus, comprising: an image outputter which outputs a virtual space image obtained by imaging a virtual space in which objects are arranged with a virtual camera; a positional relationship information outputter which outputs positional relationship information indicating a positional relationship between a predetermined referential position and an arrangement position of the object; and a positional relationship information changer which changes the positional relationship information according to a condition.

A nineteenth invention is an image processing method to be executed by an image processing apparatus, including steps of an image outputting step for outputting a virtual space image obtained by imaging a virtual space in which objects are arranged with a virtual camera; a positional relationship information outputting step for outputting positional relationship information indicating a positional relationship between a predetermined referential position and an arrangement position of the object; and a positional relationship information changing step for changing the positional relationship information according to a condition.

A twentieth invention is an image processing system, comprising: an image outputter which outputs a virtual space image obtained by imaging a virtual space in which objects are arranged with a virtual camera; a positional relationship information outputter which outputs positional relationship information indicating a positional relationship between a predetermined referential position and an arrangement position of the object; and a positional relationship information changer which changes the positional relationship information according to a condition.

In each of the eighteenth to twentieth inventions as well, similar to the first invention, it is possible to dynamically send a notice of the positional relationship information depending on the situation of the referential position, capable of heightening the degree of flexibility.

According to example embodiments of the present invention, it is possible to implement an image processing program, image processing apparatus, image processing method and image processing system capable of sending a notice of the positional relationship information, and heightening the degree of flexibility.

The above described objects and other objects, features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 3(A) shows a side of the top surface thereof, and FIG. 3(B) shows a side of the bottom surface thereof;

FIG. 4(A) shows a side of the top surface thereof, and FIG. 4(B) shows a side of the bottom surface thereof;

FIG. 14(A) shows parameters defining the height of a surface of a virtual space, and FIG. 14(B) shows variables each indicating the position of a virtual camera (referential position);

FIG. 16(A) is a calculating method of the strength of the detection, and FIG. 16(B) is a deciding method of the top-priority object based on the calculation result;

DETAILED DESCRIPTION OF THE PREFERRED EMBODIMENTS

Figure 1:
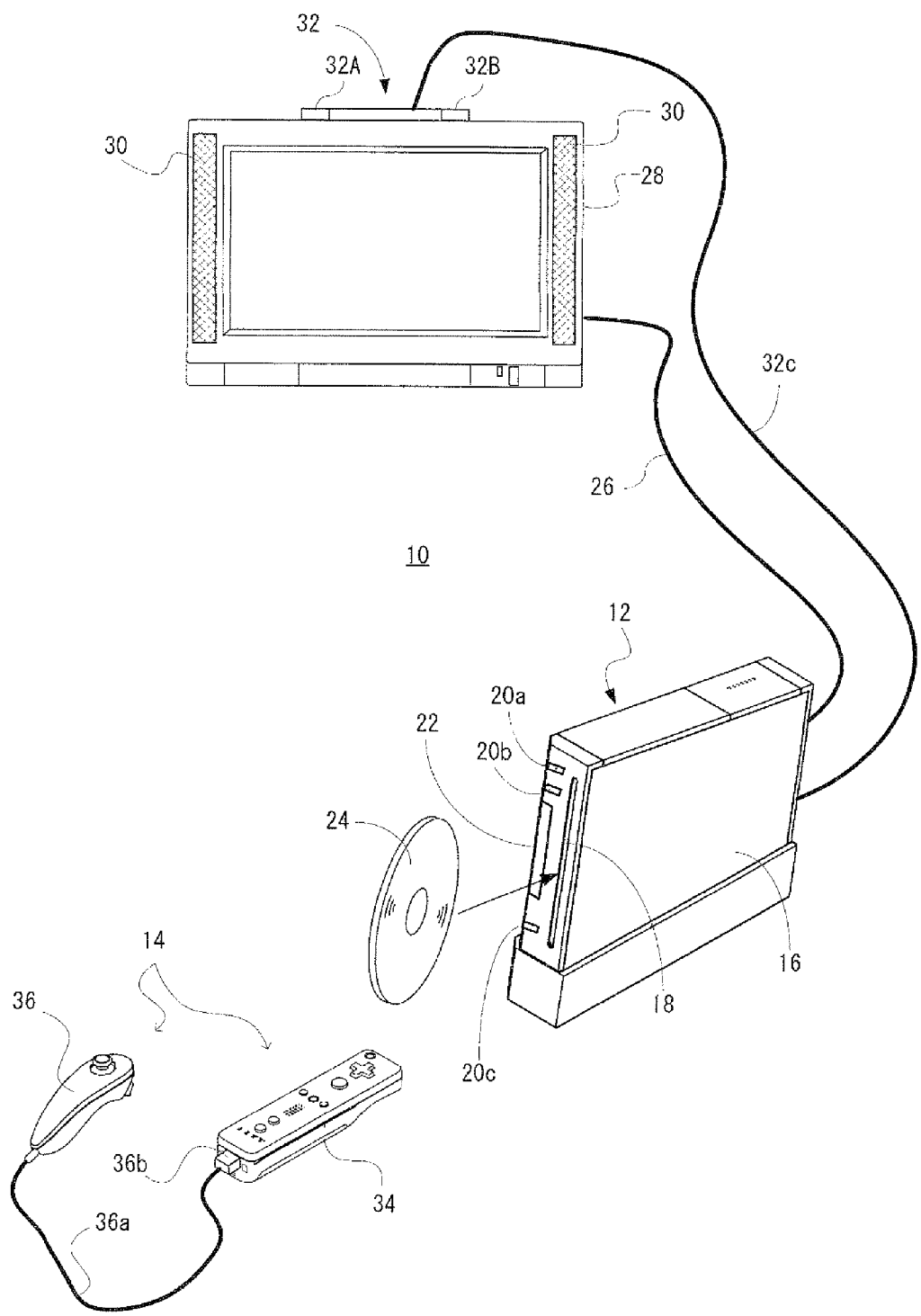
FIG. 1 is an illustrative view showing one embodiment of a game system of this invention.

Referring to FIG. 1, a game system 10 of one embodiment of the present invention includes a game apparatus 12 and a controller 14. Although illustration is omitted, the game apparatus 12 of this embodiment is designed such that it can be connected to four controllers 14 at the maximum. Furthermore, the game apparatus 12 and each of the controllers 14 are wirelessly connected. For example, the wireless communication is executed according to an MP (Multilink Protocol) or Bluetooth (registered trademark) standard, but may be executed by other standards such as infrared rays, a wireless LAN, etc. Alternatively, they may be connected by wire.

The game apparatus 12 includes a roughly rectangular parallelepiped housing 16, and the housing 16 is furnished with a disk slot 18 on a front surface. From the disk slot 18, an optical disk 24 as one example of an information storage medium storing a game program, etc. is inserted to be loaded into a disk drive 54 (see FIG. 2) within the housing 16. Although the illustration is omitted, around the disk slot 18, an LED and a light guide plate are arranged so as to make the disk slot 18 light up and off or flash in response to various processing.

Furthermore, on a front surface of the housing 16 of the game apparatus 12, a power button 20a and a reset button 20b are provided at the upper part thereof, and an eject button 20c is provided below them. In addition, a connector cover for external memory card 22 is provided between the reset button 20b and the eject button 20c, and in the vicinity of the disk slot 18. Inside the connector cover for external memory card 22, a connector for external memory card 62 (see FIG. 2) is provided, through which an external memory card 38 (hereinafter simply referred to as a "memory card 38") not shown is inserted. The memory card is employed for loading the game program, etc. read from the optical disk 24 to temporarily store it, storing (saving) game data (result data, proceeding data of the game, or replay data described later) of the game played by means of the game system 10, and so forth. Here, storing the game data described above may be performed on an internal memory, such as a flash memory 44 (see FIG. 2) provided inside the game apparatus 12 in place of the memory card 38. Also, the memory card 38 may be utilized as a backup memory of the internal memory. In addition, in the game apparatus 12, an application other than the game can be executed, and in such a case, data of the other application can be saved in the memory card 38.

It should be noted that a general-purpose SD card can be employed as a memory card 38, but other general-purpose memory cards, such as memory sticks, multimedia cards (registered trademark) can be employed. The memory card 38 can be utilized in another game apparatuses 12A having a construction similar to the game apparatus 12, and thus, it is possible to offer the game data to other players via the memory card 38.

Although omitted in FIG. 1, the game apparatus 12 has an AV cable connector 58 (see FIG. 2) on the rear surface of the housing 16, and by utilizing the AV cable connector 58, a monitor 28 and a speaker 30 are connected to the game apparatus 12 through an AV cable 26. The monitor 28 and the speaker 30 are typically a color television receiver, and through the AV cable 26, a video signal from the game apparatus 12 is input to a video input terminal of the color television, and a sound signal from the game apparatus 12 is input to a sound input terminal thereof. Accordingly, a virtual three-dimensional game image of a three-dimensional (3D) video game, for example, is displayed on the screen of the color television (monitor) 28, and stereo game sound, such as a game music, a sound effect, etc. is output from right and left speakers 30. Around the monitor 28 (on the top side of the monitor 28, in this embodiment), a marker unit 32 including two infrared ray LEDs (markers) 32A and 32B is provided. The marker unit 32 is connected to the game apparatus 12 through a power source cable 32c. Accordingly, the marker unit 32 is supplied with power from the game apparatus 12. Thus, the markers 32A and 32B emit light beams so as to output infrared rays ahead of the monitor 28.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

The controller 14, which is described in detail later, includes a first controller 34 and a second controller 36 each capable of being held with one hand as a first operation unit and a second operation unit, respectively. A cable 36a has one end extending from the rear end of the second controller 36 and the other end provided with a connector 36b. The connector 36b is connected to a connector 34a (FIG. 3, FIG. 5) provided on a rear end surface of the first controller 34. Input data obtained by the second controller 36 is applied to the first controller 34 through the cable 36a. The first controller 34 transmits controller data including the input data of the first controller 34 itself and the input data of the second controller 36 to the game apparatus.

In the game system 10, a user or a player turns the power of the game apparatus 12 on for playing the game (or applications other than the game) by a power switch 20a. Then, the user selects an appropriate optical disk 24 recording a program of a video game (or other applications the player wants to play), and loads the optical disk 24 into the disk drive 54 of the game apparatus 12. In response thereto, the game apparatus 12 starts to execute the video game or the other applications on the basis of the program recorded in the optical disk 24. The user operates the controller 14 in order to apply an input to the game apparatus 12. For example, by operating any one of the operating buttons of the operating portion 82, a game or other application is started. Besides the operation performed on operating portion 82, by moving the controller 14 itself, it is possible to move a moving image object (player object) in different directions or change the perspective of the user (camera position of the virtual game) in a three-dimensional game world.

It should be noted that the video game and other application programs are stored (installed) in an internal memory (flash memory 44 (see FIG. 2)) of the game apparatus 12, and may be executed in the internal memory. In such a case, a program stored in a storage medium like an optical disk 24 may be installed in the internal memory, and the downloaded program may be installed in the internal memory.

Figure 2:
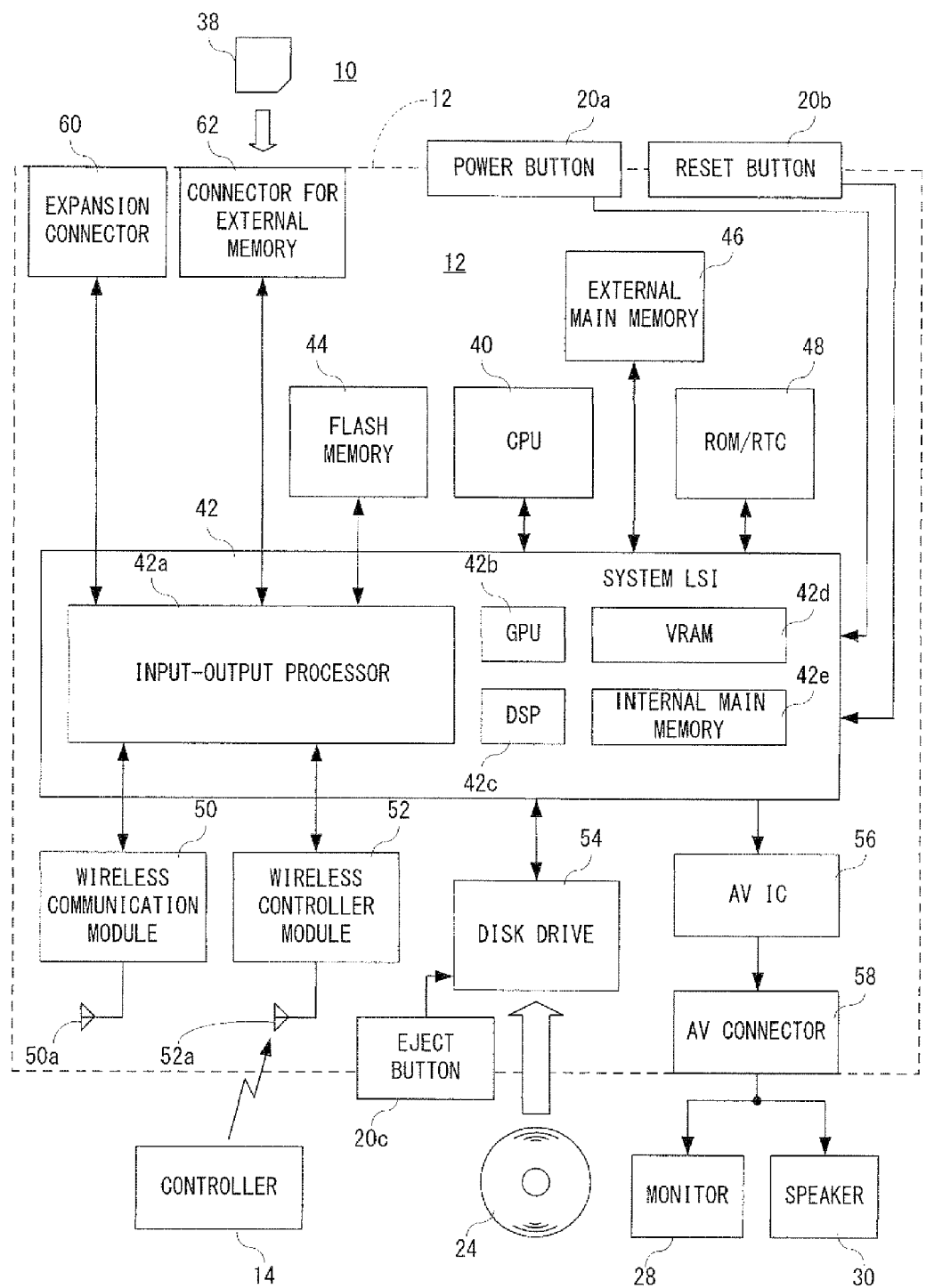
FIG. 2 is a block diagram showing an electric configuration of the game system.

FIG. 2 is a block diagram showing an electric configuration of the game system 10 shown in FIG. 1 embodiment. Although illustration is omitted, respective components within the housing 16 are mounted on a printed board. As shown in FIG. 2, the game apparatus 12 has a CPU 40 functioning as a game processor. The CPU 40 is connected with a system LSI 42. The system LSI 42 is connected with an external main memory 46, a ROM/RTC 48, the disk drive 54, and an AV IC 56.

The external main memory 46 is utilized as a work area and a buffer area of the CPU 40 by storing programs like a game program, etc. and various data. The ROM/RTC 48, which is a so-called boot ROM, is incorporated with a program for activating the game apparatus 12, and is provided with a time circuit for counting a time. The disk drive 54 reads program, texture data etc. from the optical disk 24, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e, and these are connected with one another by internal buses although illustration is omitted. The input-output processor (I/O processor) 42a executes transmission and reception of data and executes download of the data. The GPU 42b is made up of a part of a depicting means, and receives a graphics command (construction command) from the CPU 40 to generate game image data according to the command. Additionally, the CPU 40 applies an image generating program required for generating game image data to the CPU 42b in addition to the graphics command.

Although illustration is omitted, the GPU 42b is connected with the VRAM 42d as described above. The GPU 42b accesses the VRAM 42d to acquire data (image data: data such as polygon data, texture data, etc.) required to execute the construction command. Here, the CPU 40 writes image data required for depicting to the VRAM 42d via the GPU 42b. The GPU 42b accesses the VRAM 42d to create game image data for depicting.

In this embodiment, a case that the GPU 42b generates game image data is explained, but in a case that an arbitrary application except for the game application is executed, the GPU 42b generates image data as to the arbitrary application.

Furthermore, the DSP 42c functions as an audio processor, and generates audio data corresponding to a sound, a voice, music, or the like to be output from the speaker 30 by means of the sound data and the sound wave (tone) data stored in the internal main memory 42e and the external main memory 46.

The game image data and audio data generated as described above are read by the AV IC 56, and output to the monitor 28 and the speaker 30 via the AV connector 58. Accordingly, a game screen is displayed on the monitor 28, and a sound (music) necessary for the game is output from the speaker 30.

Furthermore, the input-output processor 42a is connected with a flash memory 44, a wireless communication module 50 and a wireless controller module 52, and is also connected with an expansion connector 60 and a connector for external memory card 62. The wireless communication module 50 is connected with an antenna 50a, and the wireless controller module 52 is connected with an antenna 52a.

The input-output processor 42a can communicate with other game apparatuses and servers (both of them are not shown) to be connected to a network via the wireless communication module 50. The input-output processor 42a periodically accesses the flash memory 44 to detect the presence or absence of data (referred to as data to be transmitted) being required to be transmitted to a network, and transmits it to the network via the wireless communication module 50 and the antenna 50a in a case that data to be transmitted is present. Furthermore, the input-output processor 42a receives data (referred to as received data) transmitted from another game apparatuses via the network, the antenna 50a and the wireless communication module 50, and stores the received data in the flash memory 44. In a ease that the received data does not satisfy a predetermined condition, the reception data is abandoned as it is. In addition, the input-output processor 42a can receive data (download data) downloaded from the server connected to the network via the network the antenna 50a and the wireless communication module 50, and store the download data in the flash memory 44.

Furthermore, the input-output processor 42a receives input data transmitted from the controller 14 via the antenna 52a and the wireless controller module 52, and (temporarily) stores it in the buffer area of the internal main memory 42e or the external main memory 46. The input data is erased from the buffer area after being utilized in processing (game processing, for example) by the CPU 40.

Here, the input-output processor 42a can communicate with another game apparatus directly without passing through the network via the wireless communication module 50.

In addition, the input-output processor 42a is connected with the expansion connector 60 and the connector for external memory card 62. The expansion connector 60 is a connector for interfaces, such as USB, SCSI, etc., and can be connected with medium such as an external storage and peripheral devices such as another controller different from the controller 14. Furthermore, the expansion connector 60 is connected with a cable LAN adaptor, and can utilize the cable LAN in place of the wireless communication module 50. The connector for external memory card 62 can be connected with an external storage like a memory card 38. Thus, the input-output processor 42a, for example, accesses the external storage via the expansion connector 60 and the connector for external memory card 62 to store and read the data.

Although a detailed description is omitted, as shown in FIG. 1 as well, the game apparatus 12 (housing 16) is furnished with the power button 20a, the reset button 20b, and the eject button 20c. The power button 20a is connected to the system LSI 42. When the power button 20a is turned on, the system LSI 42 is set to a mode of a normal energized state (referred to as "normal mode") in which the respective components of the game apparatus 12 are supplied with power through an AC adapter not shown. On the other hand, when the power button 20a is turned off, the system LSI 42 is set to a mode (hereinafter referred to as "standby mode") in which a part of the components of the game apparatus 12 is supplied with power, and the power consumption is reduced to minimum.

In this embodiment, in a case that the standby mode is set, the system LSI 42 issues an instruction to stop supplying the power to the components except for the input-output processor 42a, the flash memory 44, the external main memory 46, the ROM/RTC 48 and the wireless communication module 50, and the wireless controller module 52. Accordingly, in this embodiment, in the standby mode, the CPU 40 never executes an application.

The reset button 20b is also connected to the system LSI 42. When the reset button 20b is pushed, the system LSI 42 restarts a start-up program of the game apparatus 12. The eject button 20c is connected to the disk drive 54. When the eject button 20c is pushed, the optical disk 24 is ejected from the disk drive 54.

Figure 3:
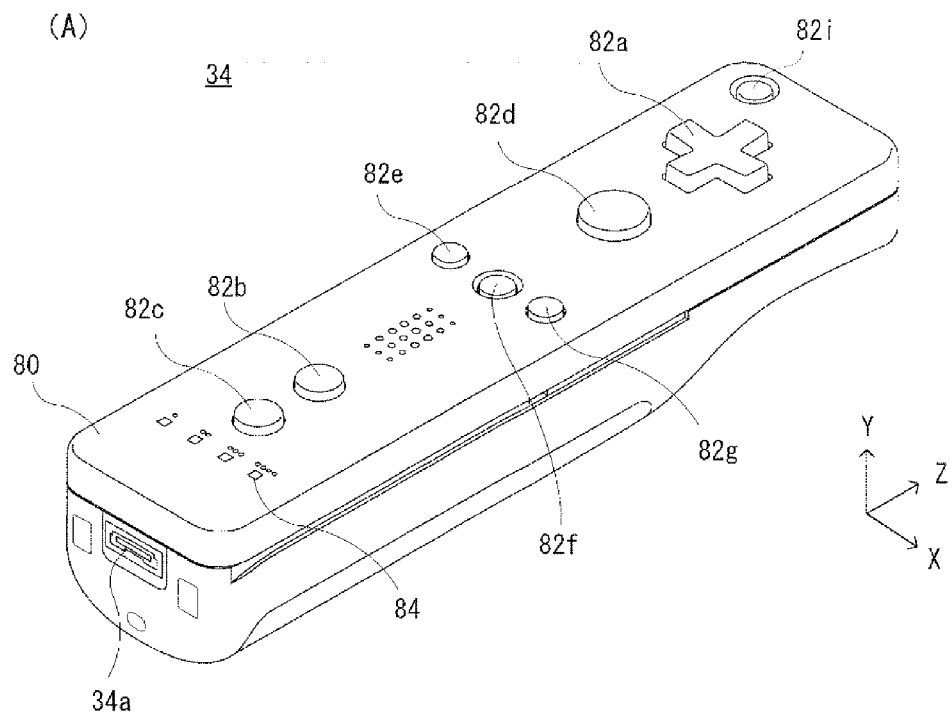
FIG. 3 is an illustrative view explaining an appearance of a first controller.
Figure 3:
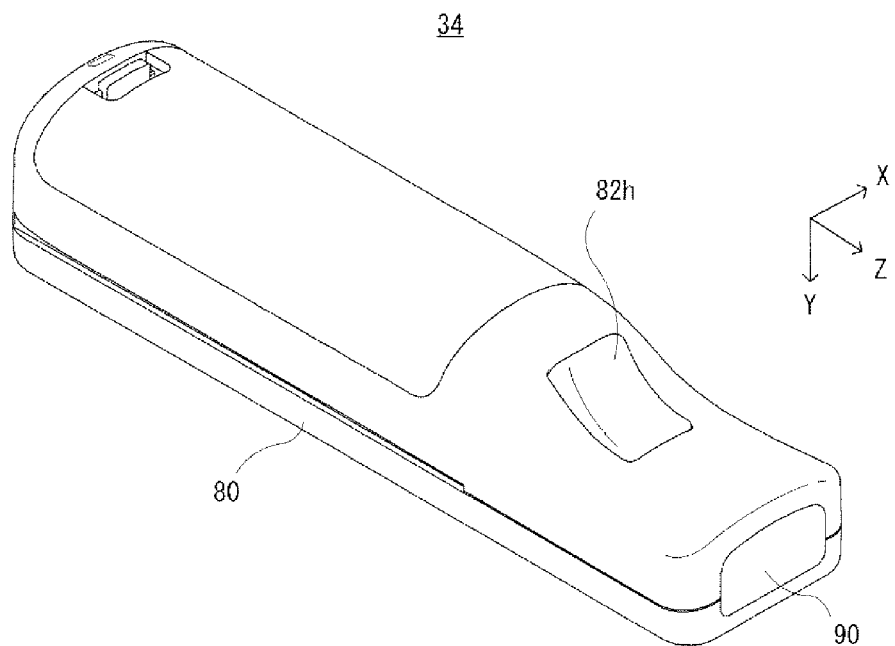

FIG. 3 shows one example of an external appearance of the first controller 34. FIG. 3 (A) is a perspective view of the first controller 34 as seeing it from above rear, and FIG. 3 (B) is a perspective view of the first controller 34 as seeing it from below front. The first controller 34 has a housing 80 formed by plastic molding, for example. The housing 80 is formed into an approximately rectangular parallelepiped shape regarding a back and forth direction (Z-axis direction shown in FIG. 3) as a longitudinal direction, and has a size small enough to be held by one hand of a child and an adult. As one example, the housing 80 has a length or a width approximately the same as that of the palm of the person. A player can perform a game operation by means of the first controller 34, that is, by pushing buttons provided on it and by changing a position and a direction of the first controller 34 by moving the first controller 34 itself.

The housing 80 is provided with a plurality of operation buttons (operation key). That is, on the top surface of the housing 80, a cross key 82a, a 1 button 82b, a 2 button 82c, an A button 82d, a −button 82e, a menu button 82f, and a +button 82g are provided. Meanwhile, on the bottom surface of the housing 80, a concave portion is formed, and on the reward inclined surface of the concave portion, a B button 82h is provided. Each of the buttons (switches) 82a-82h is assigned an appropriate function according to a game program to be executed by the game apparatus 12. Furthermore, on the top surface of the housing 80, a power switch 82i for turning on/off the power of the main body of the game apparatus 12 from a remote place is provided. The respective buttons (switches) provided on the first controller 34 may inclusively be indicated with the use of the reference numeral 82.

At the back surface of the housing 80, the above-described connector 34a is provided. The connector 34a is a 32 pin edge connector, for example, and utilized for connecting other devices to the first controller 34. In this embodiment, the connector 34a is connected with the connector 36b of the second controller 36. At the back end of the top surface of the housing 80, a plurality of LEDs 84 are provided, and the plurality of LEDs 84 show a controller number (identification number of the controller) of the controller 14. The game apparatus 12 can be connected with a maximum four controllers 14, for example. If a plurality of controllers 14 are connected to the game apparatus 12, a controller number is applied to the respective controllers 14 in the connecting order, for example. Each LED 84 corresponds to the controller number, and the LED 84 corresponding to the controller number lights up.

Furthermore, inside the housing 80 of the first controller 34, an acceleration sensor 86 (FIG. 5) is provided. As an acceleration sensor 86, acceleration sensors of an electrostatic capacity type can typically be utilized. The acceleration sensor 86 detects accelerations of a linear component for each sensing axis and gravitational acceleration out of the accelerations applied to a detection portion of the acceleration sensor. More specifically, in this embodiment, a three-axis acceleration sensor is applied to detect the respective accelerations in directions of three axes of a up and down direction (Y-axial direction shown in FIG. 3), a right and left direction (X-axial direction shown in FIG. 3), and a forward and rearward direction (Z-axial direction shown in FIG. 3) of the first controller 34.

It should be noted that as an acceleration sensor 86, two-axis acceleration sensors may be utilized for detecting any two of the directions of the accelerations out of the up and down direction, the right and left direction and the back and forth direction according to the shape of the housing 80, the limitation on how to hold the first controller 34, or the like. Under certain circumstances, a one-axis acceleration sensor may be used.

Figure 5:
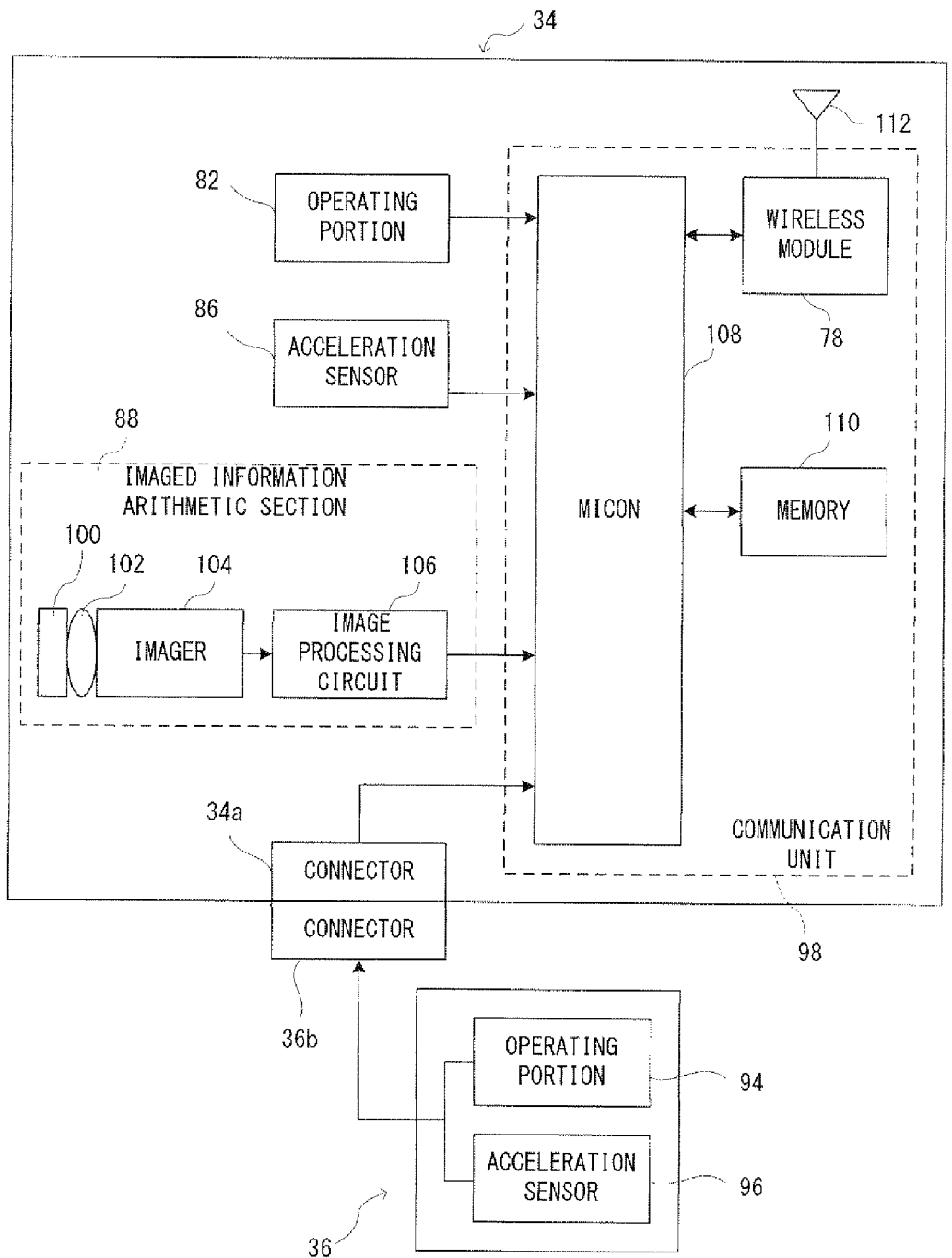
FIG. 5 is a block diagram showing an electric configuration of the controllers (first controller and second controller are connected with each other)

In addition, the first controller 34 has an imaged information arithmetic section 88 (see FIG. 5). As shown in FIG. 3(B), on the front end surface of the housing 80, a light incident opening 90 of the imaged information arithmetic section 88 is provided, and from the light incident opening 90, infrared rays emitted by the markers 44m and 44n of the sensor bar 44 are captured.

Figure 4:
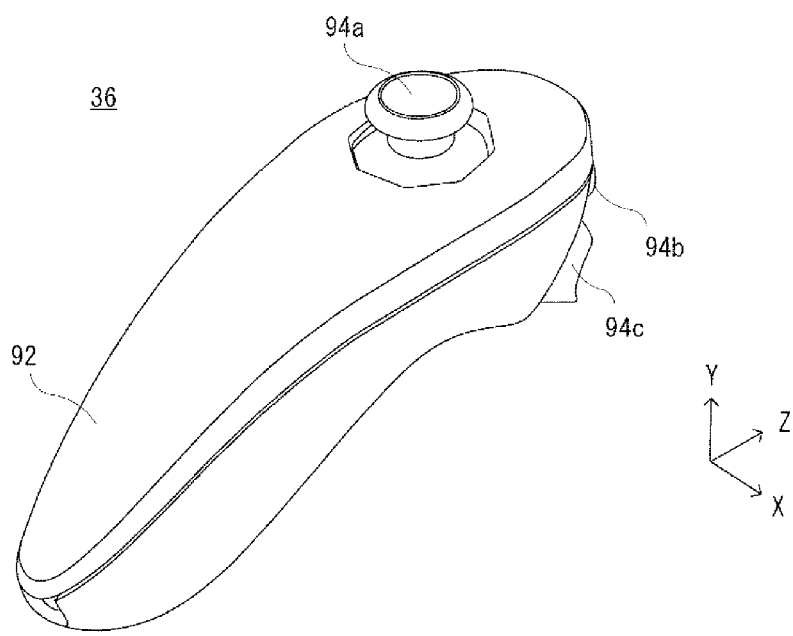
FIG. 4 is an illustrative view showing an appearance of a second controller.
Figure 4:
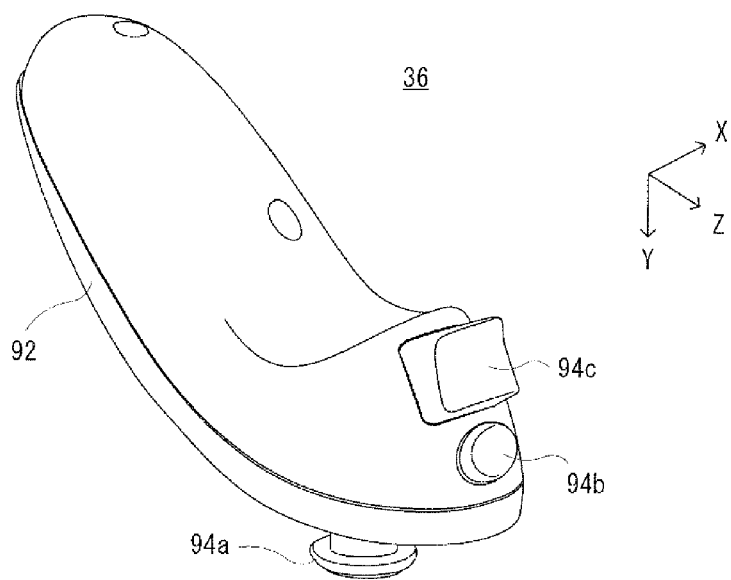

FIG. 4 shows one example of an appearance of the second controller 36. FIG. 4 (A) is a perspective view of the second controller 36 as seeing it from above rear, and FIG. 4 (B) is a perspective view of the second controller 36 as seeing it from below front. Additionally, in FIG. 4, the cable 36a of the second controller 36 is omitted.

The second controller 36 has a housing 92 formed by plastic molding, for example. The housing 92 is formed into an approximately thin long elliptical shape in the forward and backward directions (Z-axis direction in FIG. 4) when viewed from plan, and the width of the right and left direction (X-axis direction in FIG. 4) at the back end is narrower than that of the front end. Furthermore, the housing 92 has a curved shape as a whole when viewed from a side, and downwardly curved from a horizontal portion at the front end to the back end. The housing 92 has a size small enough to be held by one hand of a child and an adult similar to the first controller 34 as a whole, and has a longitudinal length (in the Z-axis direction) slightly shorter than that of the housing 80 of the first controller 34. Even with the second controller 36, the player can perform a game operation by operating buttons and a stick, and by changing a position and a direction of the controller by moving itself.

At the end of the top surface of the housing 92, an analog joystick 94a is provided. At the end of the housing 92, a front edge slightly inclined backward is provided, and on the front edge are provided a C button 94b and a Z button 94c vertically arranged (Y-axis direction in FIG. 4). The analog joystick 94a and the respective buttons 94b and 94c are assigned appropriate functions according to a game program to be executed by the game apparatus 12. The analog joystick 94a and the respective buttons 94b and 94c provided to the second controller 36 may be inclusively denoted by means of the reference numeral 94.

Inside the housing 92 of the second controller 36, an acceleration sensor 96 (FIG. 5) is provided. As the acceleration sensor 96, an acceleration sensor similar to the acceleration sensor 86 in the first controller 34 is applied. More specifically, the three-axis acceleration sensor is applied in this embodiment, and detects accelerations in the respective three axis directions like an up and down direction (Y-axial direction shown in FIG. 4), a right and left direction (X-axial direction shown in FIG. 4), and a forward and backward direction (Z-axial direction shown in FIG. 4) of the second controller 36.

Additionally, the shapes of the first controller 34 shown in FIG. 3 and the second controller 36 shown in FIG. 4 and the shape, the number and the setting position of the buttons (switches, stick, or the like), etc. are merely one example, and can be changed to other shapes, numbers and setting positions, etc. as needed.

Furthermore, the controller 34 is powered by a battery (not illustrated) detachably housed in the first controller 34. The second controller 36 is supplied with the power through the connector 34a, the connector 40, and the cable 36a.

FIG. 5 shows one example of an electric configuration of the controller 14 when the first controller 34 and the second controller 36 are connected with each other. The first controller 34 contains a communication unit 98, and the communication unit 98 is connected with the operating portion 82, the acceleration sensor 86, the imaged information arithmetic section 88 and the connector 34a. The operating portion 82 indicates the above-described operation buttons or operating switches 82a-82i. When the operating portion 82 is operated, an operation signal (key information) is applied to the communication unit 98. The data indicative of acceleration detected by the acceleration sensor 86 is output to the communication unit 98. The acceleration sensor 86 has in the order of a maximum sampling period of 200 frames per second.

The data taken in by the imaged information arithmetic section 88 is also output to the communication unit 98. The imaged information arithmetic section 88 is constituted by an infrared filter 100, a lens 102, an imager 104 and an image processing circuit 106. The infrared filter 100 passes only infrared rays from the light incident from the light incident opening 90 at the front of the first controller 34. As described above, the markers 44m and 44n of the sensor bar 44 placed near (around) the display screen of the monitor 30 are infrared LEDs for outputting infrared lights forward the monitor 30. Accordingly, by providing the infrared filter 100, it is possible to image the image of the markers 44m and 44n more accurately. The lens 102 condenses the infrared rays passing thorough the infrared filter 100 to emit them to the imager 104. The imager 104 is a solid imager, such as a CMOS sensor and a CCD, for example, and images the infrared rays condensed by the lens 102. Accordingly, the imager 104 images only the infrared rays passing through the infrared filter 100 to generate image data. Hereafter, the image imaged by the imager 104 is called an "imaged image". The image data generated by the imager 104 is processed by the image processing circuit 106. The image processing circuit 106 calculates positions of objects to be imaged (markers 44m and 44n) within the imaged image, and outputs marker coordinates data including each coordinate value indicative of the position to the communication unit 98 for each predetermined time (one frame, for example). It should be noted that a description of the image processing circuit 106 is made later.

The connector 34a is connected with the connector 36b of the cable 36a extending from the second controller 36. The connector 36b is connected with the operating portion 94 and the acceleration sensor 96 of the second controller 36. The operating portion 94 denotes the above-described analog joystick 94a and operation buttons 94b and 94c. When the operating portion 94 is operated, an operation signal is applied to the communication unit 98 via the cable 36a, the connector 36b, the connector 34a, etc. The acceleration sensor 96 also has a sampling period similar to that of the acceleration sensor 86, and applies the data indicative of the detected acceleration to the communication unit 98.

The communication unit 98 includes a microcomputer (micon) 108, a memory 110, a wireless module 78 and an antenna 112. The micon 108 transmits the obtained data to the game apparatus 12 and receives data from the game apparatus 12 by controlling the wireless module 78 while using the memory 110 as a memory area (working area and buffer area) in processing.

The data output from the operating portion 82, the acceleration sensor 86 and the imaged information arithmetic section 88 of the first controller 34, and the operating portion 94 and acceleration sensor 96 of the second controller 36 to the micon 108 is temporarily stored in the memory 110. The wireless transmission from the communication unit 98 to the Bluetooth communication unit 76 of the game apparatus 12 is performed every predetermined cycle. The game processing is generally performed by regarding 1/60 seconds as a unit, and therefore, it is necessary to perform the transmission from the first controller 34 at a cycle equal to or shorter than it. The micon 108 outputs data including the operation data of the operating portions 82 and 94 and the acceleration data of the acceleration sensors 86 and 96, and marker coordinates data from the imaged information arithmetic section 88 stored in the memory 110 to the wireless module 78 as controller data when transmission timing to the game apparatus 12 has come. The wireless module 78 modulates a carrier of a predetermined frequency by the controller data, and emits its weak radio wave signal from the antenna 112 by using a short-range wireless communication technique, such as Bluetooth. Namely, the controller data is modulated to the weak radio wave signal by the wireless module 78 and transmitted from the first controller 34. The weak radio wave signal is received by the Bluetooth communication unit 76 of the game apparatus 12. The weak radio wave thus received is subjected to demodulating and decoding processing, thus making it possible for the game apparatus 12 to obtain the controller data.

The CPU 46 of the game apparatus 12 performs the game processing on the basis of the controller data obtained from the controller 14.

It will be appreciated by those skilled in the art from the description of this specification that a computer, such as a processor (CPU 46, for example) of the game apparatus 12 or the processor (micon 108, for example) of the controller 14 executes processing on the basis of an acceleration signal output from the acceleration sensors 86 and 96, and whereby, more information relating to the controller 14 can be estimated or calculated (determined). In a case that processing is executed on the side of the computer assuming that the first controller 34 and second controller 36 respectively incorporated with the acceleration sensors 86 and 96 are in a static state (that is, processing is executed considering that accelerations detected by the acceleration sensors 86 and 96 are only gravitational accelerations), if the first controller 34 and the second controller 36 are actually in a static state, it is possible to know whether or not the orientations of the first controller 34 and the second controller 36 are inclined with respect to the direction of gravity or to what extent they are inclined on the basis of the detected acceleration. More specifically, when a state in which the detection axes of the acceleration sensors 86 and 96 are directed to a vertically downward direction is taken as a reference, merely whether or not 1G (gravitational acceleration) is imposed on can show whether or not each of the first controller 34 and the second controller 36 is inclined, and the size can show to what extent each of them is inclined. Furthermore, if a multi-axes acceleration sensor is applied, by further performing processing on an acceleration signal of each axis, it is possible to more precisely know to what extent the first controller 34 and the second controller 36 are inclined with respect to the direction of gravity. In this case, on the basis of outputs from the acceleration sensors 86 and 96, the computer may perform processing of calculating data of inclined angles of the first controller 34 and second controller 36, but perform processing of estimating an approximate inclination on the basis of the outputs from the acceleration sensors 86 and 96 without performing the processing of calculating the data of the inclined angle. Thus, by using the acceleration sensors 86 and 96 in conjunction with the computer, it is possible to determine an inclination, an orientation or a position of each of the first controller 34 and second controller 36.

On the other hand, assuming that the acceleration sensors 86 and 96 are in a dynamic state, accelerations according to the movement of the acceleration sensors 86 and 96 are detected in addition to the gravitational acceleration component, and therefore, if the gravitational acceleration component is removed by predetermined processing, it is possible to know a moving direction, etc. More specifically, in a case that the first controller 34 and the second controller 36 respectively being furnished with the acceleration sensors 86 and 96 are accelerated and moved by the hands of the user, acceleration signals generated by the acceleration sensors 86 and 96 are processed by the above-described computer, and whereby, it is possible to calculate various movements and/or positions of the first controller 34 and the second controller 36. Additionally, even when assuming that the acceleration sensors 86 and 96 are in a dynamic state, if an acceleration in correspondence with the movement of each of the acceleration sensors 86 and 96 is removed by the predetermined processing, it is possible to know the inclination with respect to the direction of gravity. In another embodiment, each of the acceleration sensors 86 and 96 may contain a built-in signal processing apparatus or other kinds of dedicated processing apparatuses for performing desired processing on the acceleration signal output from the incorporated acceleration detecting means before outputting the signal to the micon 108. For example, in a ease that the acceleration sensors 86 and 96 are ones for detecting a static acceleration (gravitational acceleration, for example), the built-in or dedicated processing apparatuses may be ones for transforming the detected acceleration signal into the inclined angle (or other preferable parameters) corresponding thereto.

Figure 6:
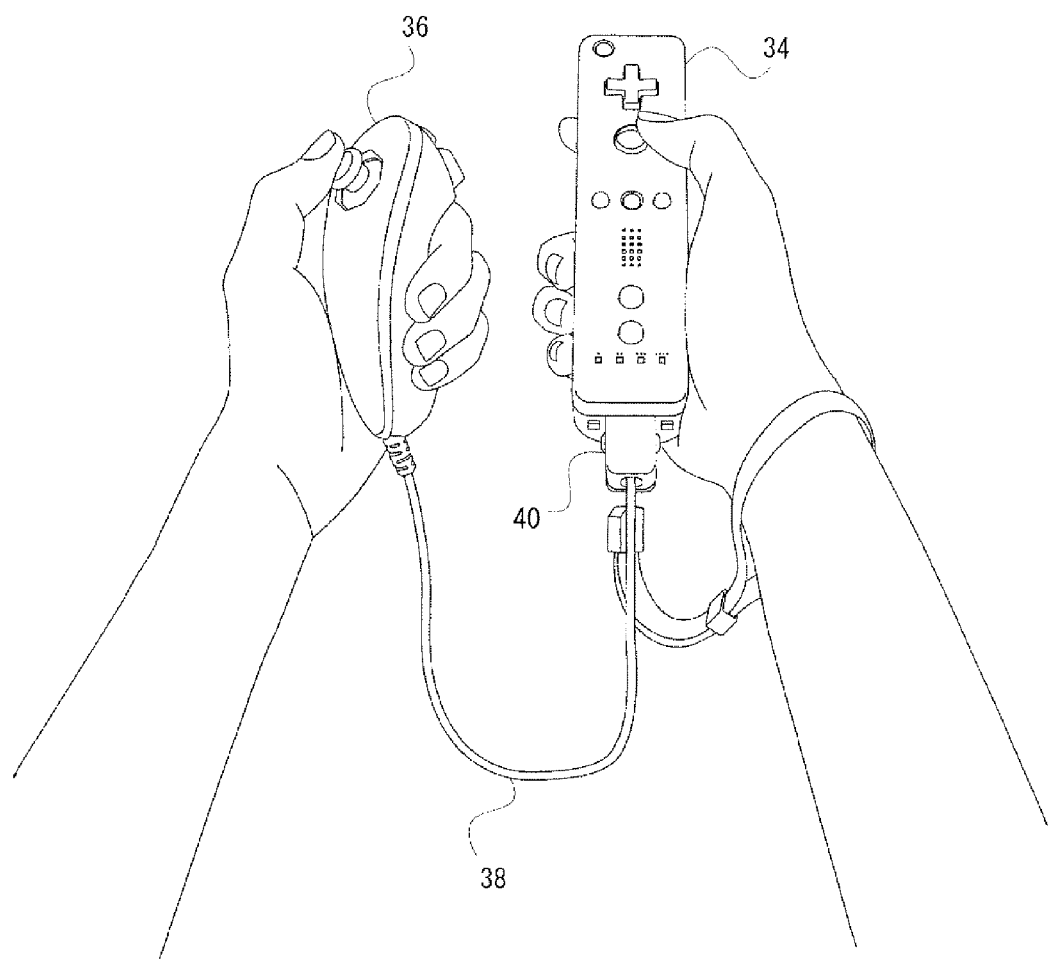
FIG. 6 is an illustrative view roughly showing a state in which a virtual game (dowsing game) is played by using the controllers.

In this game system 10, a user can make an operation or input to the game by moving the controller 14. In playing the game, the user holds the first controller 34 with the right hand and the second controller 36 with the left hand as shown in FIG. 6. As described above, in this embodiment, the first controller 34 contains the acceleration sensor 86 for detecting accelerations in the three-axis directions, and the second controller 36 also contains the same acceleration sensor 96. When the first controller 34 and the second controller 36 are moved by the user, acceleration values respectively indicating the movements of the controllers are detected by the acceleration sensor 86 and the acceleration sensor 96. In the game apparatus 12, game processing can be executed according to the detected acceleration values.

Furthermore, the first controller 34 is provided with the imaged information arithmetic section 88, and this makes it possible for the user to utilize the first controller 34 as a pointing device. In this case, the user holds the first controller 34 with the edge surface (light incident opening 90) of the first controller 34 directed to the markers 44*m* and 44*n*. It should be noted that as understood from FIG. 1, the markers 44*m* and 44*n* are placed around a predetermined side (top or bottom) of the monitor 30 in parallel with the predetermined side. In this state, the user can perform a game operation by changing a position on the screen designated by the first controller 34 by moving the first controller 34 itself, and by changing distances between the first controller 34 and each of the markers 44*m* and 44*n*.

Figure 7:
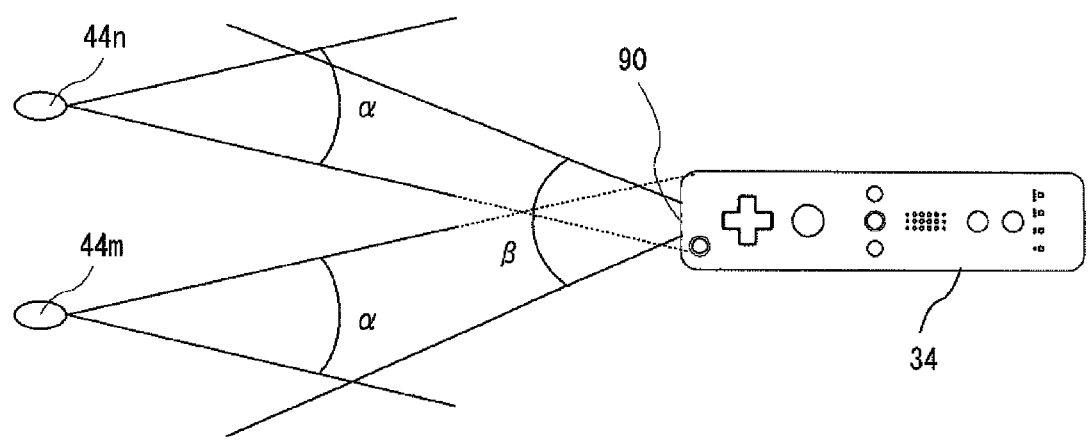
FIG. 7 is an illustrative view showing viewing angles of markers and the controller.

FIG. 7 is a view explaining viewing angles between the respective markers 44*m* and 44*n*, and the first controller 34. As shown in FIG. 7, each of the markers 44*m* and 44*n* emits infrared ray within a range of a viewing angle $\alpha$. Also, the imager 104 of the imaged information arithmetic section 88 can receive incident light within the range of the viewing angle $\beta$ taking the line of sight of the first controller 34 (Z axis direction in FIG. 3) as a center. For example, the viewing angle $\alpha$ of each of the markers 44*m* and 44*n* is 34° (half-value angle) while the viewing angle $\beta$ of the imager 104 is 42°. The user holds the first controller 34 such that the imager 104 is directed and positioned so as to receive the infrared rays from the markers 44*m* and 44*n*. More specifically, the user holds the first controller 34 such that at least one of the markers 44*m* and 44*n* exists in the viewing angle $\beta$ of the imager 104, and the first controller 34 exists in at least one of the viewing angles $\alpha$ of the marker 44*m* or 44*n*. In this state, the first controller 34 can detect at least one of the markers 44*m* and 44*n*. The user can perform a game operation by changing the position and the orientation of the first controller 34 in the range satisfying the state. Also, in a case that any one of the makers 44*m* and 44*n* is only detected, by setting temporary marker coordinates in place of the other marker which is not detected by means of data detecting the previous two makers 44*m* and 44*n*, a designated position by the first controller 34 can be calculated.

If the position and the orientation of the first controller 34 are out of the range, the game operation based on the position and the orientation of the first controller 34 cannot be performed. Hereafter, the above-described range is called an "operable range."

Figure 8:
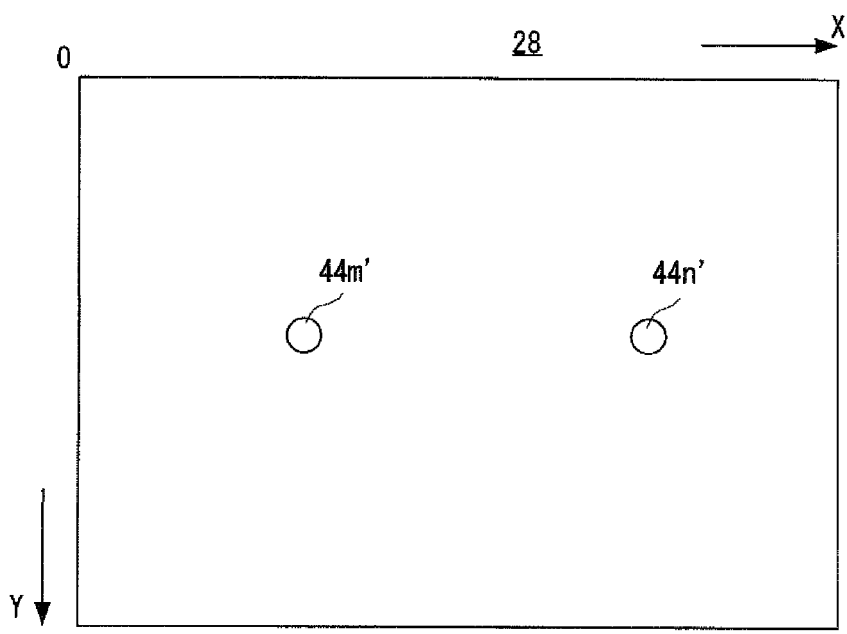
FIG. 8 is an illustrative view showing one example of an imaged image by the controller.

If the first controller 34 is held within the operable range, an image of each of the markers 44*m* and 44*n* is imaged by the imaged information arithmetic section 88. That is, the imaged image obtained by the imager 104 includes an image (object image) of each of the markers 44*m* and 44*n* as an object to be imaged. FIG. 8 is an illustrative view showing one example of the imaged image including object images. The image processing circuit 106 calculates coordinates (marker coordinates) indicative of the position of each of the markers 44*m* and 44*n* in the imaged image by utilizing the image data of the imaged image including the object images 44*m*' and 44*n*'.

Because the object images 44*m*' and 44*n*' appear as high-intensity parts in the image data of the imaged image, the image processing circuit 106 first detects the high-intensity parts as a candidate of the object images. Next, the image processing circuit 106 determines whether or not each of the high-intensity parts is an object image on the basis of the size of the detected high-intensity part. The imaged image may include images other than the object image due to sunlight through a window and light of a fluorescent lamp in the room as well as the two object images 44*m*' and 44*n*' (marker images). The determination processing whether or not the high-intensity part is an object image is executed for discriminating the images 44*m*' and 44*n*' of the two markers 44*m* and 44*n* as object images from the images other than them, and accurately detecting the object images. In order to discriminate the object images 44*m*' and 44*n*' in the imaged image from other images, the imaging objects 44*m* and 44*n* are necessary to be known, and in this embodiment, the size is decided in advance, and therefore, it is possible to estimate the size of the marker images 44*m*' and 44*n*'. Thus, on the basis of the size of the high-intensity part, it is possible to make a determination of the marker images 44*m*' and 44*n*'. More specifically, in the determination processing, it is determined whether or not each of the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 106 calculates the position of the high-intensity part. More specifically, the barycenter position of the high-intensity part is calculated. Here, the coordinates of the barycenter position is called "marker coordinates". Also, the barycenter position can be calculated with more detailed scale than the resolution of the imager 104. Now, the resolution of the imaged image imaged by the imager 104 shall be 126×96, and the barycenter position shall be calculated with the scale of 1024×768. That is, the marker coordinates is represented by the integer from (0, 0) to (1024, 768).

Additionally, as shown in FIG. 8, the position in the imaged image is represented in a coordinate system (X-Y coordinate system of the imaged image) by taking the upper left of the imaged image as an original point O, the downward direction as the Y-axis positive direction, and the right direction as the X-axis positive direction.

Furthermore, in a case that the object images 44*m*' and 44*n*' are accurately detected, two high-intensity parts are determined as object images by the determination processing, and therefore, it is possible to calculate two marker coordinates. The image processing circuit 106 outputs data indicative of the calculated two marker coordinates, that is, imaging object data indicative of positions of the imaging objects to the communication unit 98. The output imaging object data (marker coordinate data) is included in the controller data by the micon 108 as described above, and transmitted to the game apparatus 12.

When taking in the marker coordinate data from the received controller data, the game apparatus 12 (CPU 46) can calculate a designated position (designated coordinates) of the first controller 34 on the screen of the monitor 30 and the distance from the first controller 34 to each of the markers 44*m* and 44*n* on the basis of the marker coordinate data. For example, when the first controller 34 designates the left end of the monitor 30, the object images 44*m*' and 44*n*' are detected at the right of the imaged image, and when the first controller 34 designates the lower end of the screen, the object images 44*m*' and 44*n*' are detected at the upper portion of the imaged image. In other words, the marker coordinates on the imaged image are detected at positions reverse to the designated position of the first controller 34 on the screen. Accordingly, when the coordinates of the designated position of the first controller 34 are calculated from the marker coordinates, the coordinate system is appropriately transformed from the coordinate system of the imaged image in FIG. 8 to a coordinate system for representing positions on the screen.

Additionally, in this embodiment, the first controller 34 performs predetermined arithmetic processing on the imaged data to detect the marker coordinates, and transmit the marker coordinate data to the game apparatus 12. However, in another embodiment, imaged data is transmitted as controller data from the first controller 34 to the game apparatus 12, and the CPU 46 of the game apparatus 12 may perform predetermined arithmetic processing on the imaged data to detect the marker coordinates and the coordinates of the designated position.

Furthermore, the distance between the object images in the imaged image is changed depending on the distance between the first controller 34 and each of the markers 44*m* and 44*n*. Because the distance between the markers 44*m* and 44*n*, the width of the imaged image, and the viewing angle β of the imager 104 are decided in advance, by calculating the distance between the two marker coordinates, the game apparatus 12 can calculate the current distance between the first controller 34, and each of the markers 44*m* and 44*n*.

Here, how to operate the controllers in the game may be another manner, and the game may be played only by using the first controller 34. For example, the game may be played with the first controller 34 held with both hands.

Figure 9:
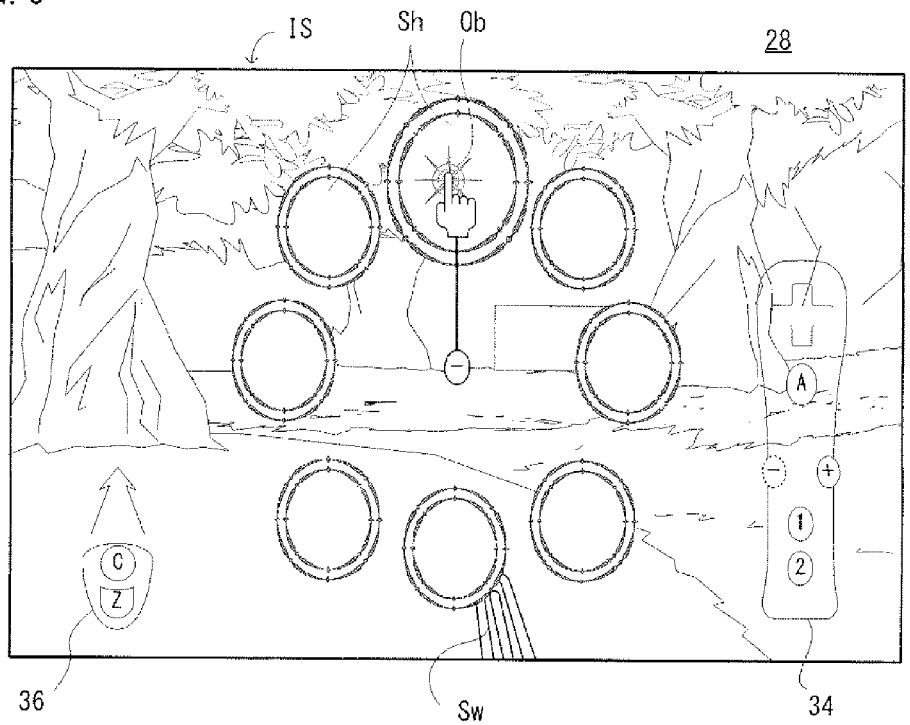
FIG. 9 is an illustrative view showing one example of a game screen (when an object is being selected)
Figure 10:
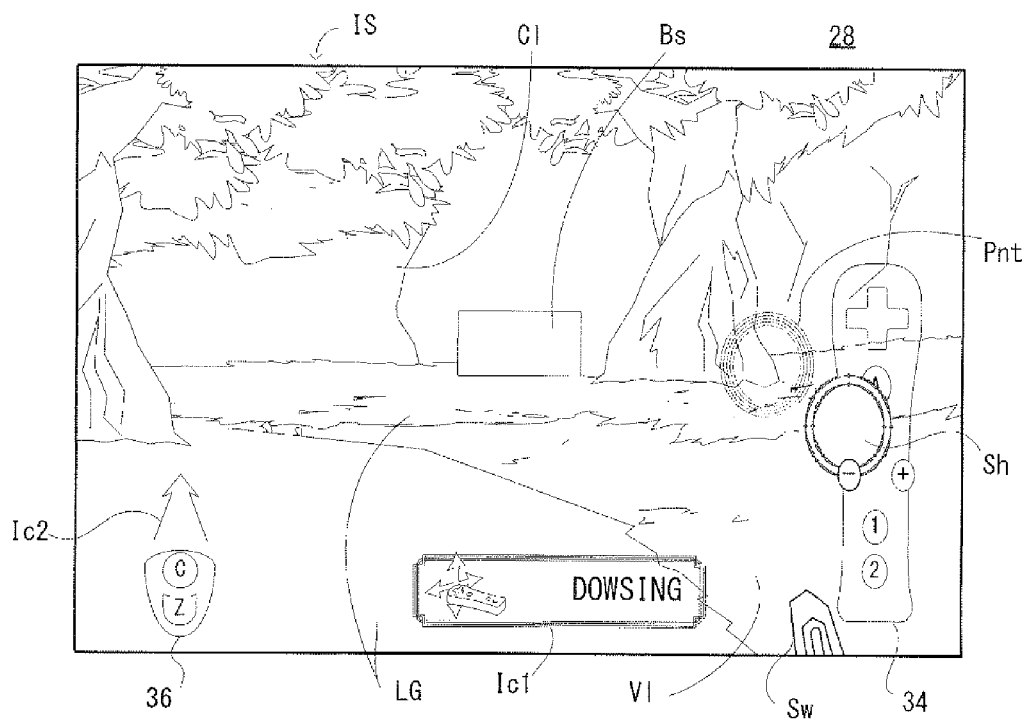
FIG. 10 is an illustrative view showing another example of the game screen during dowsing: outside the detection range)
Figure 11:
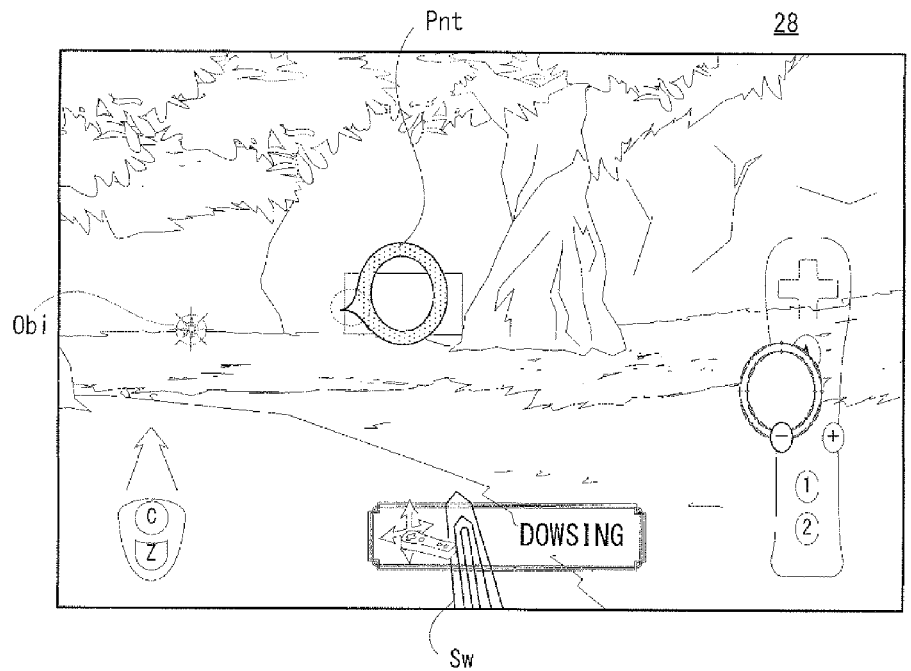
FIG. 11 is an illustrative view showing a still another example of the game screen (during dowsing: increased distance within the detection range)
Figure 12:
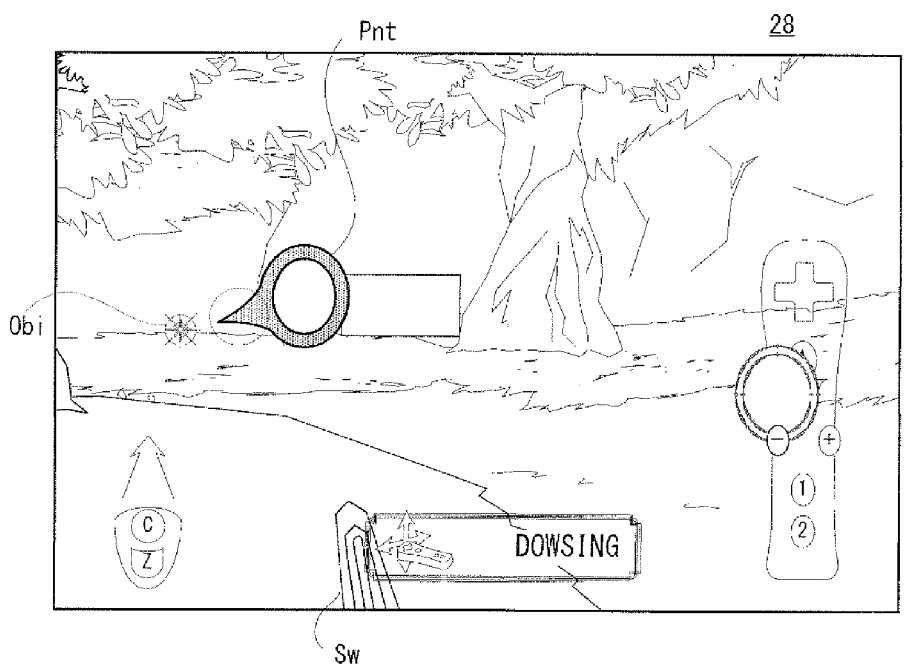
FIG. 12 is an illustrative view showing a further example of the game screen (during dowsing: decreased distance within the detection range)

When a "dowsing game" of this embodiment is played in the game system 10 configured as described above, the game screens as shown in. FIG. 9 to FIG. 12 are displayed on the monitor 28, for example. The game screen in FIG. 9 is a screen for selecting an object being a target to be dowsed (hereinafter, referred to as "target object" or "target") Obi out of the objects (Ob1, Ob2, . . . : this may simply be described by "Ob" when distinction from one another is not needed) arranged in the virtual space IS, and the game screens in FIG. 10 to FIG. 12 are screens in which the target object Obi is being searched by dowsing.

The outline is first described. In each of all FIG. 9 to FIG. 12, a virtual space image obtained by imaging a virtual space IS where the objects Ob1, Ob2, . . . are arranged with a virtual camera (IC: see FIG. 14(A), and etc.) is depicted on the game screen. The virtual camera IC corresponds to a viewpoint (first-person perspective) of the player character which makes the search by dowsing. Thus, the image of the player character itself is not displayed on the game screen.

Generally, dowsing is a method of finding underground artifacts, such as underground water and minerals by a movement of a simple tool, for example, rod and pendulum.

Figure 17:
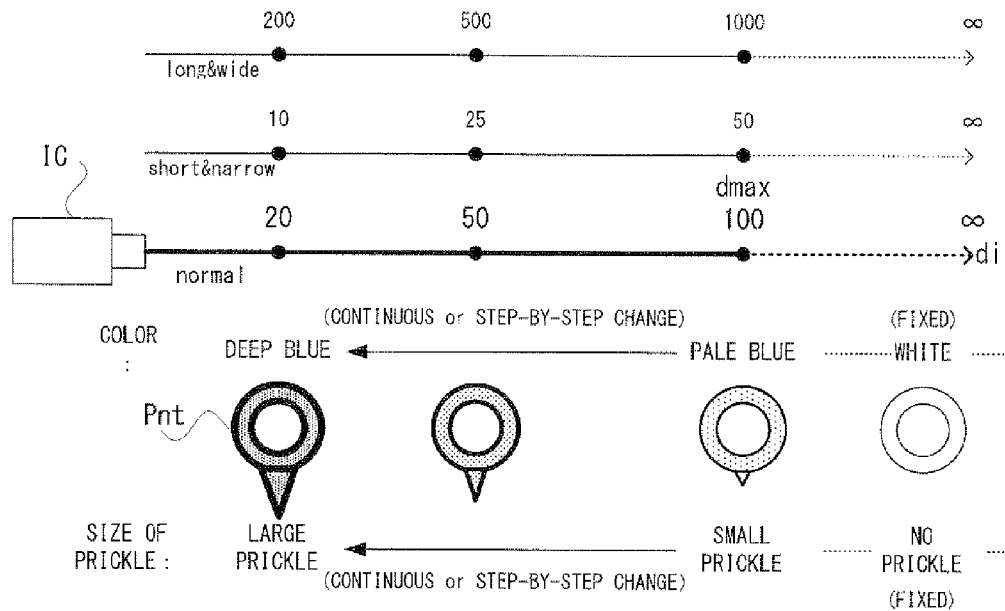
FIG. 17 is an illustrative view showing a positional relationship between the virtual camera and the object by a pointer image.

In the dowsing game, the player character performs dowsing by using a sword Sw to search for an object Obi. On the game screen, the sword Sw and a pointer Pnt indicating the result (strength and direction) of the dowsing by the sword Sw are displayed. The strength and direction of the dowsing change in correspondence with a positional relationship between the player character having the sword Sw, that is, the virtual camera IC and the object Obi. The pointer Pnt visually represents the positional relationship between the virtual camera IC and the object Obi by a change of the color and the size of the prickle as shown in FIG. 17, for example.

That is, one main feature of this embodiment is in dowsing image processing (see FIG. 21) of generating an image of the pointer Pnt which changes the manner, such as the color and size of its prickle here in correspondence with the positional relationship between the virtual camera IC and the object Obi, and depicting the pointer image on the game image.

Here, as to the object (Ob1, Ob2, . . . ), the target object Obi is shown by the dotted lines in FIG. 11 and FIG. 12 for the sake of convenience of description, but the purpose of the dowsing is searching for something underground and thus, it is not displayed on the actual game screen.

The pointer Pnt changes as shown in FIG. 10 to FIG. 12 in correspondence with the positional relationship between the player character having the sword Sw, that is, the virtual camera IC and the target object Obi. FIG. 10 shows a case that the virtual camera IC is far from the object Obi in terms of the distance and the angle, and the pointer Pnt in this state is a simple white circle.

Here, the object of "far in terms of the distance" is an object for which the distance (d4) from the virtual camera IC (viewpoint) is larger than a threshold value (dmax) like an object Ob4 shown in FIG. 16(A), for example, and the object of "far in terms of the angle" is an object for which an angle (θ 5) formed with respect to an optical axis (glance) of the virtual camera IC is larger than a threshold value (θ max) like an object Ob5.

Thereafter, as shown in FIG. 11 and FIG. 12, when the positional relationship between the virtual camera IC and the target object Obi enters a predetermined range (di≤dmax and θ i≤θ max), the pointer Pnt is colored pale blue and has a small prickle. As they approach to each other, the pointer Pnt is colored dark blue and has the prickle increased in size.

That is, in the dowsing game, the sword Sw has a dowsing ability to detect the target object Obi and change the manner of the pointer Pnt from a simple white circle to a blue circle with prickle, and further change the depth of blue and the size of the prickle in correspondence with the positional relationship within the predetermined range.

Accordingly, the player can estimate an approximate position of the object Obi by moving the position of the player character, that is, the virtual camera IC and changing the direction of the glance, that is, the optical axis direction while seeing the changes of the pointer Pnt.

Figure 16:
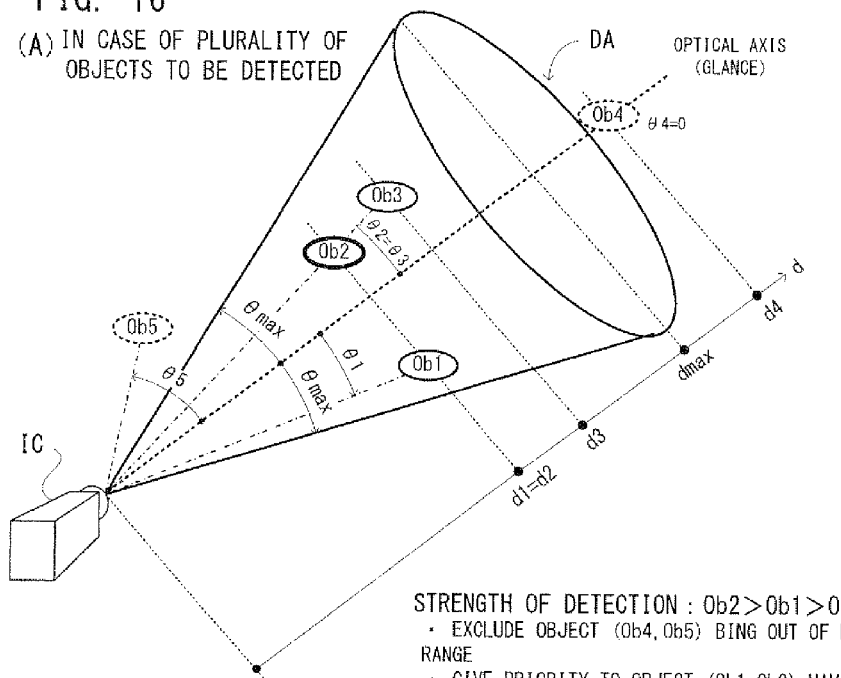
FIG. 16 is an illustrative view showing a deciding method of a top-priority object.
Figure 16:
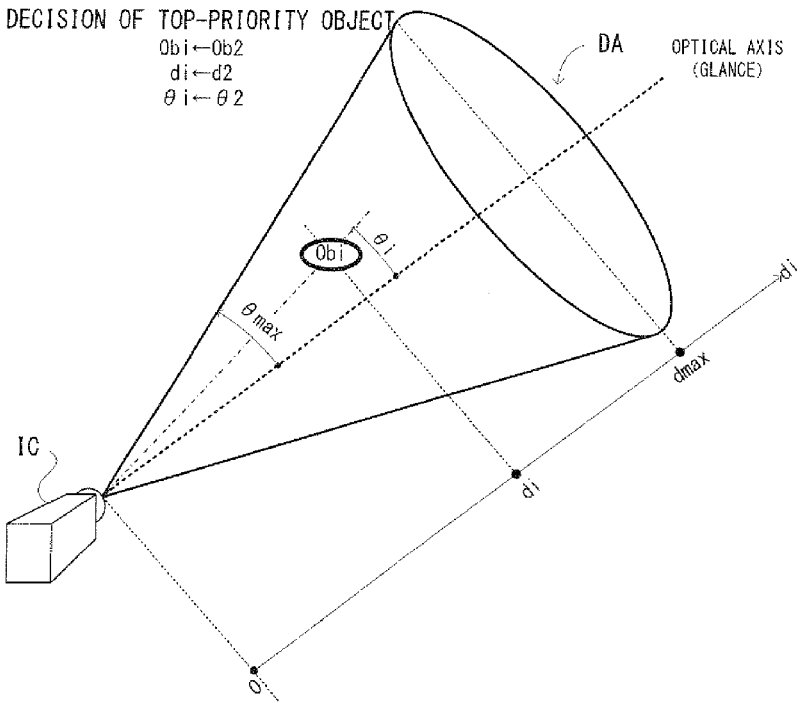

Hereafter, such a predetermined range, that is, a range in which the target object Obi is detected by the dowsing with the sword Sw (di≤dmax, θ i≤θ max) is called "detection range DA" (see FIG. 16).

Figure 14:
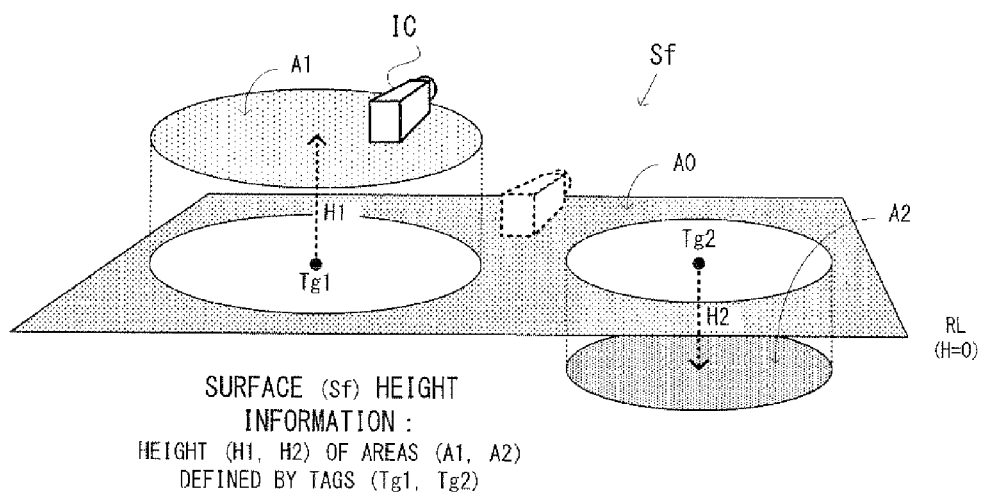
FIG. 14 is an illustrative view showing parameters and variables for the dowsing image processing.
Figure 14:
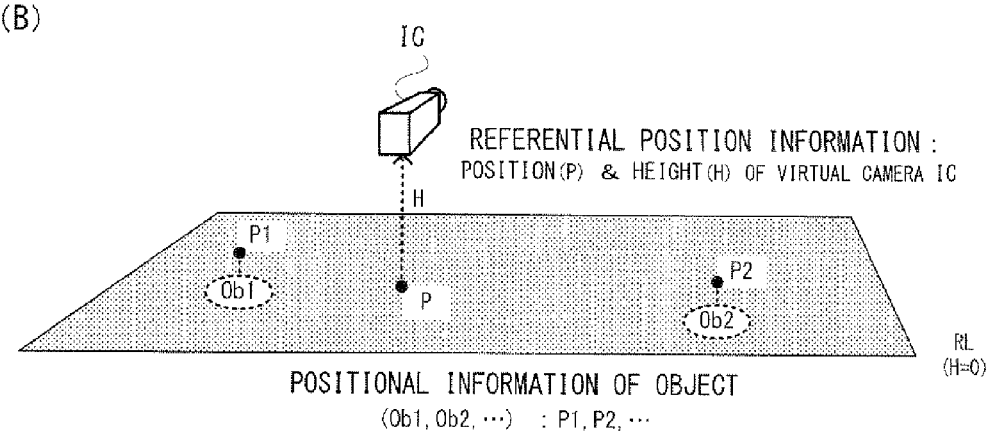
Figure 15:
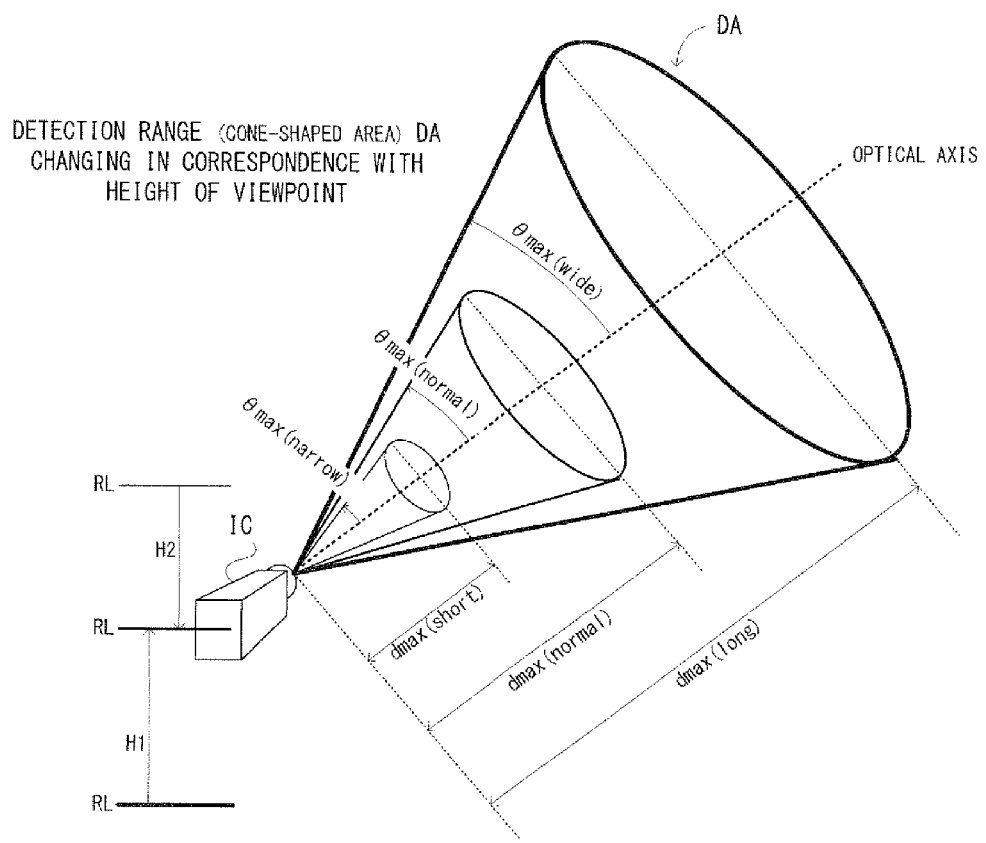
FIG. 15 is an illustrative view showing a detection range changing in correspondence with the height of the virtual camera.

Then, another main feature of this embodiment is that the detection range DA is changed (set) in correspondence with the viewpoint, that is, the height H (=H1, H2, . . . ) of the virtual camera IC as shown in FIG. 14(A) and FIG. 15.

A description is next made focusing on the features. The ground of the virtual space IS is made up of a level ground LG, a cliff C1, a valley V1, etc. as shown in FIG. 10, and a base Bs is set on the level ground LG. The virtual camera IC, that is, the player character dowses the object (Ob1, Ob2, . . . ), such as coins, buried underground with the sword Sw while moving up and down on the ground and the base Bs (hereinafter, referred to as "surface"). At this time, the viewpoint, that is, the height of the virtual camera IC changes along the surface Sf defined as shown in FIG. 14(A), for example.

Referring to FIG. 14(A), the surface Sf roughly represents the virtual space IS shown in FIG. 10 by a reference level RL and tags Tg1, Tg2, . . . provided thereon. The reference level RL corresponds to a level ground LG, for example, and the height shall be "0". In each tag Tg1, Tg2, . . . , the center, the radius and the height are described. Accordingly, the respective tags Tg1, Tg2, . . . represent circle areas A1, A2, . . . respectively corresponding to a cliff C1 and a valley V1 and the height H1, H2, . . . thereof. Here, the information representing the surface Sf in such a manner is displayed as surface height information 78 in FIG. 13.

On the other hand, the position and the optical axis direction (the direction of the glance) of the virtual camera IC (player character) are controlled according to an operation by the controller 14 (first controller 34 and second controller 36). On the game screen, icons of the first and second controllers (34 and 36) and icons Ic1 and Ic2 indicating the functions thereof, an icon Sh indicating the function set to the "-" button of the second controller 34 are translucently displayed on the virtual space image (IS).

The icon Ic1 indicates the change of the optical axis direction of the virtual camera IC in correspondence with the direction of the first controller 34. The icon Ic2 indicates the change of the position of the virtual camera IC in accordance with the operation with the second controller 34. The icon Sh in association with the "-" button of the controller 34 indicates that a dowsing ability capable of detecting a specific kind of the object is given to the sword Sw. Here, the division of the function between the first controller 34 and the second controller 36 is one example and is appropriately changed.

The dowsing ability (kind of the detectable object) to be given to the sword Sw can arbitrarily be selected through the game screen shown in FIG. 9. On the game screen, eight icons Sh representing various objects, such as gold coins and items are shown. When the player selects one of them (icon Sh representing a gold coin, for example), the selected icon. Sh is brought into association with the "-" button of the controller 34 as shown in FIG. 10 to FIG. 12.

Thus, the dowsing ability capable of detecting a gold coin is applied to the sword Sw. Hereafter, the player can perform dowsing with the sword Sw by pushing the "-" button when he or she wants to search for a gold coin. However, such a button operation is one example and can arbitrarily be changed.

During dowsing, the virtual camera IC moves in an arbitrary direction along the surface Sf shown in FIG. 14(A). The height H (see FIG. 14(B)) of the virtual camera IC changes at a timing when the virtual camera IC crosses over the border between the area A0 and A2, and the detection range DA changes in correspondence with the height H of the virtual camera IC at this point as shown in FIG. 15, for example.

That is, in a case that the virtual camera IC is positioned within the area A0 (the player character is on the level ground LG), the height H of the virtual camera IC is "0", and "normal" is used as a reference detection range DA. Thereafter, when the virtual camera IC enters the area A1 (the player character climbs the cliff C1), the height H of the virtual camera IC changes (increases) from "0" to "H1", and the detection range DA is enlarged from "normal" to "long&wide". On the other hand, when the virtual camera IC enters the area A2 (the player character goes down to the valley V1), the height H of the virtual camera IC changes (decreases) from "0" to "H2", and the detection range DA is reduced from "normal" to "short&narrow". Thus, when the height of the virtual camera is high, a good view of surrounding is offered, so that the detection range is set to be large, and when the height of the virtual camera is low, a poor view is offered, so that the detection range is set to be small, capable of presenting a realistic search to the player.

Here, the initial value (called "basic detection range") of the detection range DA is "normal" in this embodiment, but in a modified example, "long&wide" and "short&narrow" may be set in correspondence with the attribute of the detection object. For example, if the object to be detected is a moving object, such as "animals", it is difficult to detect it, and thus by setting "long&wide" as an initial value, the object is made easily detectable, capable of properly setting the difficulty level of the game. Also, if the object to be detected is a rare object, such as "diamonds", by setting "short&narrow" as an initial value, the object is made hardly detectable, capable of giving the player a feeling of accomplishment when this is searched. The typical attributes also include a size other than the movement and the rarity. For example, because the larger object is easily found, the detection range is set to be large. Such a control of the detection range DA based on the attribute is typically executed at the initial setting, but may suitably be executed during dowsing without being restricted thereto.

Furthermore, the change of the detection range DA is based on both of the distance d and the angle θ in this embodiment, but only any one of them may be changed. In addition, whether both of the distance d and the angle θ are changed, only the distance d is changed, or only the angle θ is changed may be decided on the basis of the attribute of the object to be detected.

If there are a plurality of objects to be detected within the detection range DA, one of them is decided as a top-priority object according to the procedure shown in FIG. 16, for example. The top-priority object here is an object for which the strength of the detection by dowsing becomes maximum, and the sword Sw responds to the top-priority object. Accordingly, the pointer Pnt is positional relationship information visually representing a positional relationship between the virtual camera IC and the top-priority object.

The strength of the detection is calculated based on the positional relationship between the virtual camera IC and each object, that is, based on the distance d and the angle θ. In calculation, the distance d has priority over the angle θ. Which one is the top-priority object out of the plurality of objects within the detection range DA is basically decided by first comparing the distances d between the objects, and by further comparing the angles θ if there are objects having the same distance from the virtual camera IC. It should be noted that if two objects to be detected are placed at positions symmetric with respect to an optical axis, the objects exceptionally have the same distance and the same angle, and in such a case, an arbitrary one may be selected.

For example, as shown in FIG. 16(A), in a case that five objects to be detected (objects Ob1-Ob5) are present around the optical axis (glance) of the virtual camera IC, the objects Ob4, Ob5 positioned out of the detection range DA are excluded form the candidates (d4>dmax, θ5>θmax). Among the objects Ob1-Ob3 within the detection range DA, the objects Ob1, Ob2 having smaller distances d have priority (d1=d2<d3). Between the objects Ob1, Ob2 having the same distance, the object Ob2 having a smaller angle θ has top priority (θ2<θ1).

Accordingly, because the strength of detection of the object Ob2 is maximum, the top-priority object is decided as an object Ob2 as shown in FIG. 16(B). The result of the decision is reflected on the variables (object Obi, distance di, angle θi) for controlling the pointer Pnt (Obi←Ob2, di←d2, θ i←θ 2).

The manner of the pointer Pnt is controlled on the basis of the positional relationship between the virtual camera IC and the object to be detected (Obi), that is, the distance di and/or the angle θi. In this embodiment, the color of the pointer t and the size of the prickle are controlled mainly on the basis of the distance di as shown in FIG. 17, for example. The color and the size of the prickle are independent of the angle θ i (in a case of θ i≤θ max, here).

In a case that di>dmax, that is, the virtual camera IC and the target object Obi are far from each other, the pointer Pnt is fixed to a state of "white & absence of the prickle". Here, in a case of θi>θmax as well, the pointer Pnt is fixed to the state of "white & absence of the prickle".

If the virtual camera IC and the target object Obi are close to each other to satisfy di=dmax, the pointer Pnt which had been a simple white circle until now changes to pale blue, and has a small prickle. In a case of di<dmax, the shorter the distance di is, the deeper blue the pointer Pnt is in color, and the larger the prickle is. Such a change may be made continuously or step by step.

Figure 18:
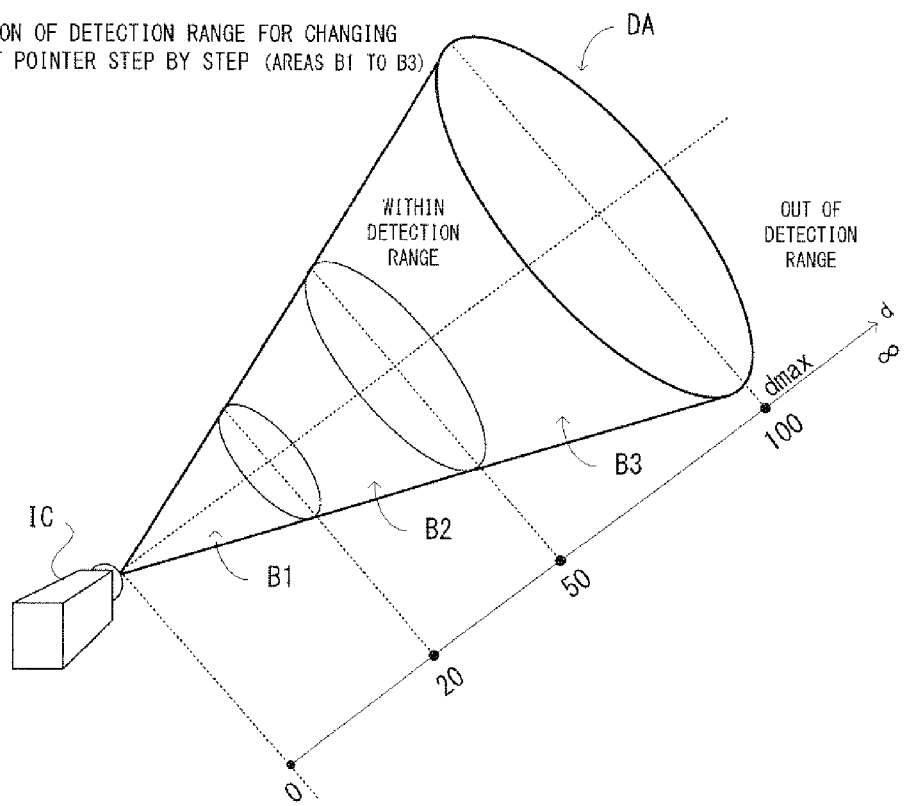
FIG. 18 is an illustrative view showing an example of dividing the detection range.

In a case that the manner of the pointer Put (color and size of the prickle) are changed step by step, the detection range DA is sectioned into a plurality of areas (three area B1, B2, B3 respectively corresponding to three sections 0<di≤20, 20<di≤50, 50<di≤100) along the distance di as shown in FIG. 18, for example.

It should be noted that the number of sections (3) and values of the borders (20, 50, 100) are one example, and may suitably be changed in accordance with the scene of the game and the attribute of the object Obi. Furthermore, the value of the border changes among (10, 25, 50), (20, 50, 100) and (200, 500, 1000) in accordance with the change of the detection range DA from the short&narrow to the long&wide through the normal as shown in FIG. 15, for example. The rate of change 0.5:1:10 is also merely one example, and may suitably be changed. Also, the number of sections may be changed in correspondence with the width of the detection range DA. In addition, the detection range DA may be sectioned in a two-dimensional manner (meshed) along both of the distance di and the angle θi.

Thus, by differentiating the color of the pointer Pnt and the presence or absence of the prickle between the inside (di≤dmax and θ i≤θ max) and the outside (di>dmax or θ i>θ max) of the detection range DA ("white & absence of the prickle" and "colored & presence of the prickle"), and further changing continuously or step by step the depth of the color and the size of the prickle in correspondence with the distance di within the detection range DA, it is possible to visually present the player character, that is, the positional relationship between the virtual camera IC and the target object Obi.

Figure 19:
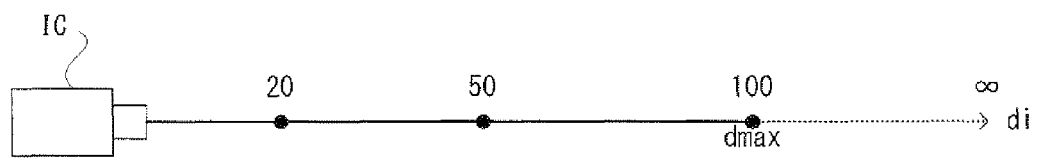
FIG. 19 is an illustrative view showing another expression example of a positional relationship (in a case of being represented by vibrations and search sounds)

Here, the positional relationship may be presented in a tactile or audible manner as shown in FIG. 19 through vibrations of the controller 14 and a search sound from the speaker 30, for example, as well as be visually presented through the pointer Pnt. More specifically, outside the detection range DA, the vibration is fixed to the weakest state, and the search sound is fixed to a late periodical sound "PE . . . PE . . . ".

Into the detection range DA from the outside, the vibrations change from the weakest state to a weak, medium or strong state, and the search sound changes from the late periodical sound "PE . . . PE . . . " to a slow periodical sound "PE.P-E.PE.", a moderate periodical sound "PePePe" or a fast periodical sound "PPPPPPP". Which strength and velocity the vibrations and the search sound are changed to is dependent on the distance di at a time of entering the detection range DA. For example, when the angle θi is decreased over the θmax, if di=50, the vibrations change from the weakest state to the medium state, and the search sound changes from the late periodical sound "PE . . . PE . . . " to the moderate periodical sound "PePePe". Although the description is omitted in the above, the changes of the pointer Pnt at this point are a change from "white & absence of prickle" to "normal blue and medium prickle".

Within the detection range DA, as the distance di is decreased, the strength of the vibration (amplitude and/or cycle) is increased, such as weak→medium→strong, and the cycle of the search sound is increased as in "PE.PE.PE."→"PePePe"→"PPPPPP". In a case of being out of the detection range DA from the inside or in a case that the distance di is increased within the detection range DA, reciprocal changes thereof occur.

Here, in place of changing the cycle of the search sound, or in addition thereto, a cycle of emission of the LED 84 may be changed.

Figure 13:
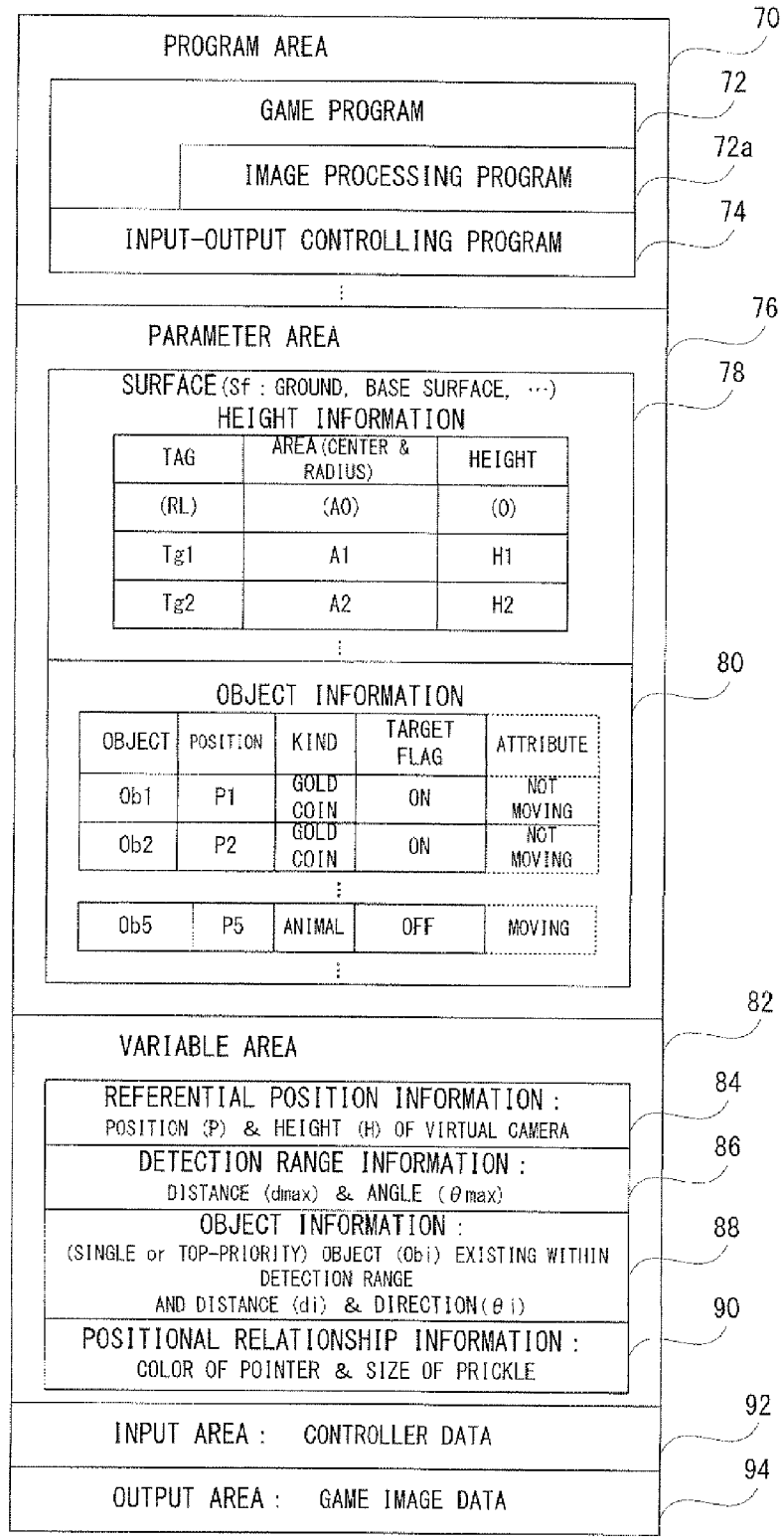
FIG. 13 is an illustrative view showing a part of a memory map of a main memory.
Figure 20:
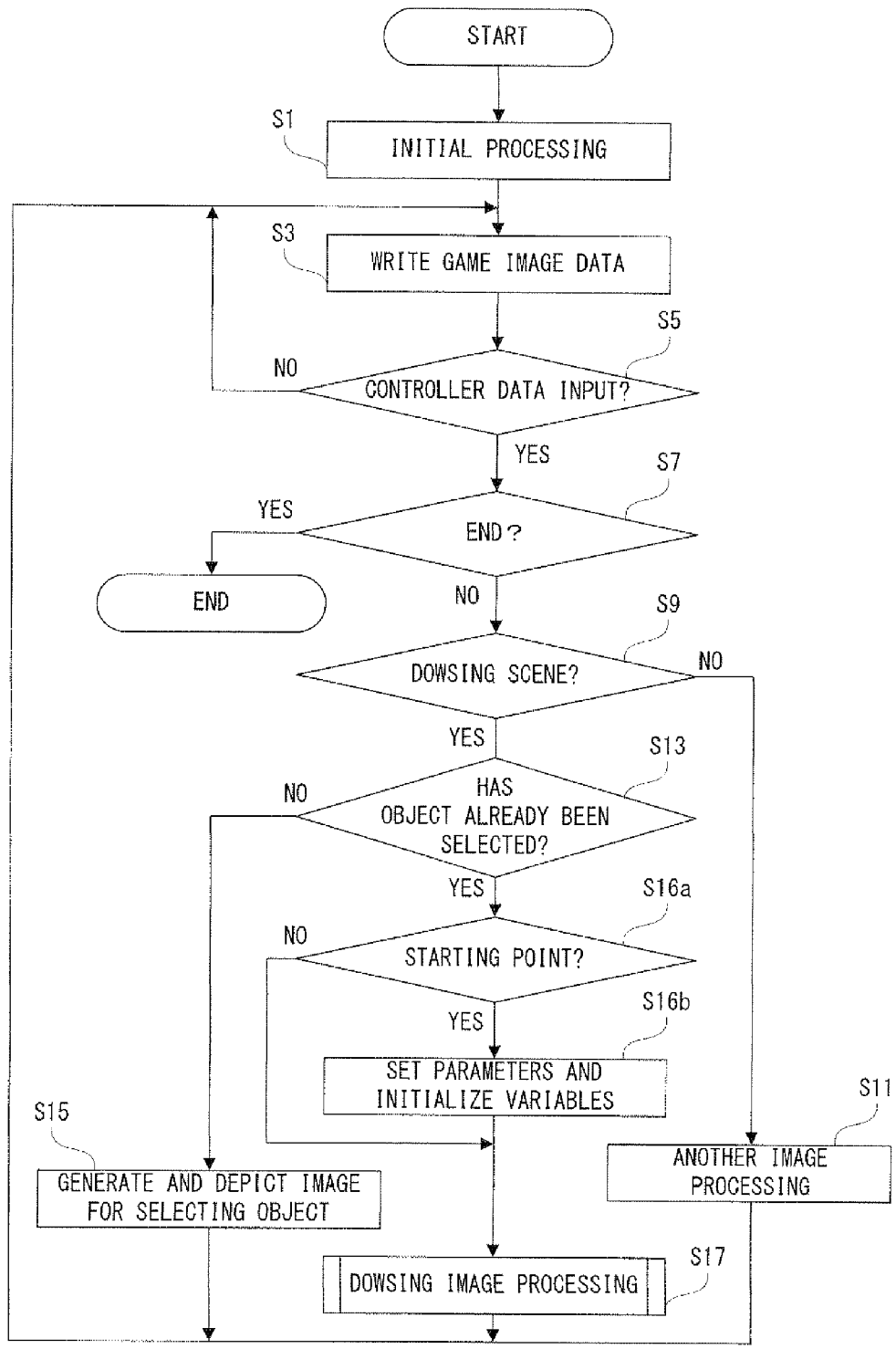
FIG. 20 is a flowchart showing a part of an operation by a CPU (game image processing)
Figure 21:
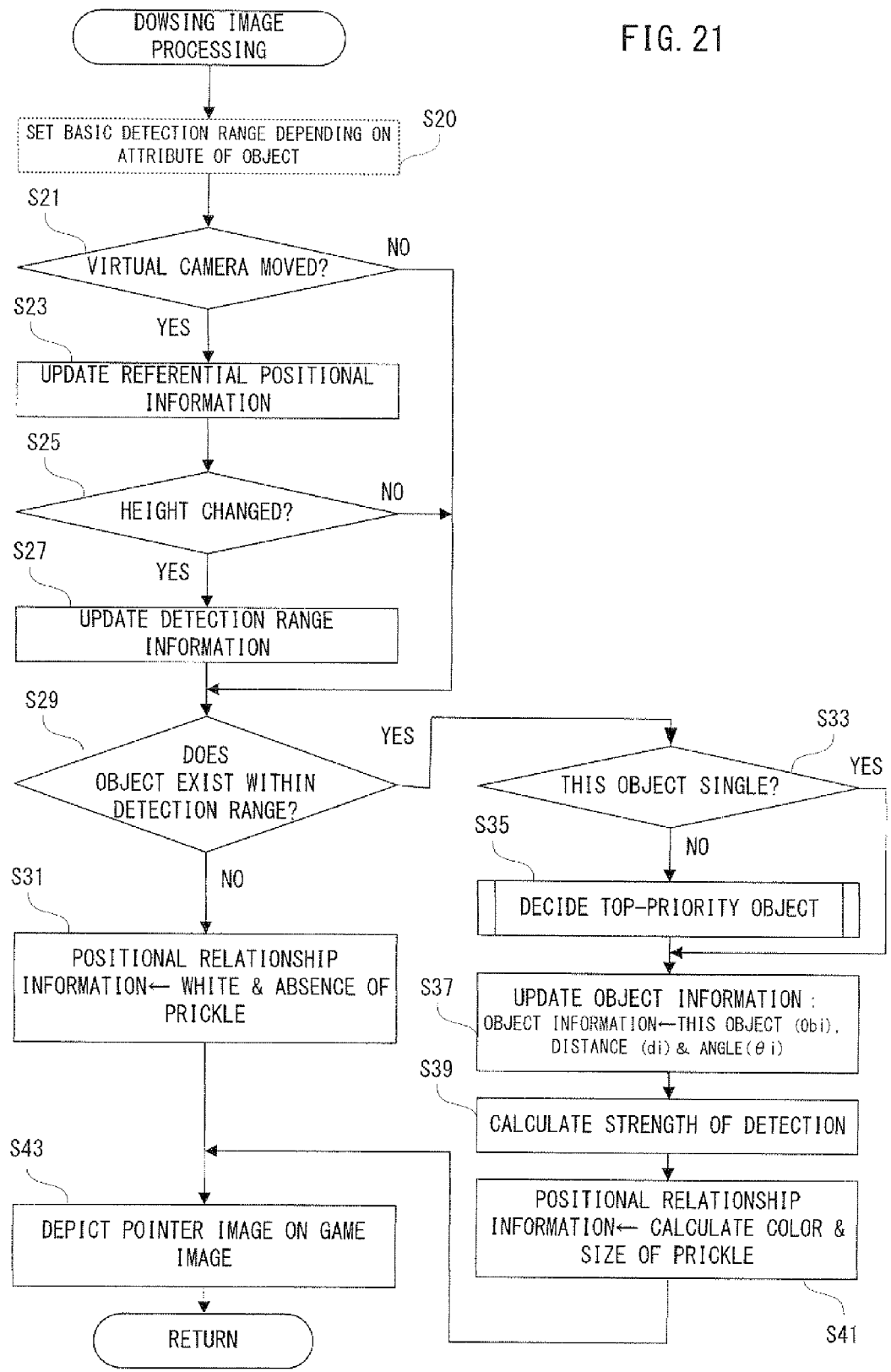
FIG. 21 is a flowchart showing dowsing image processing included in the game image processing.
Figure 22:
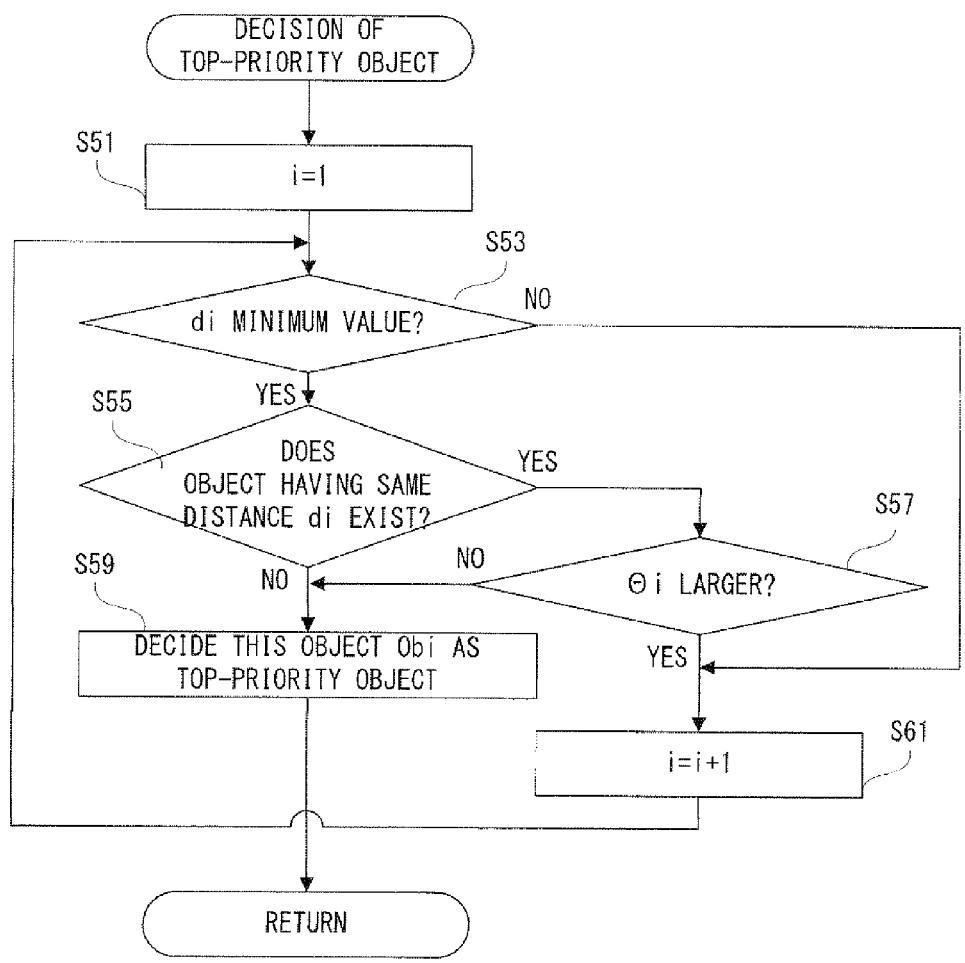
FIG. 22 is a flowchart showing top-priority object deciding processing included in the dowsing image processing.

The image processing as described above is implemented by executing flowcharts shown in FIG. 20 to FIG. 22 by the CPU 40 in cooperate with the system LSI 42 on the basis of programs and information (various parameters, variables, input and output data) shown in FIG. 13 which are stored in the main memory 42*e* and/or 46.

In the main memory 42*e* and/or 46, a program area 70, a parameter area 76, a variable area 82, an input area 92 and an output area 94 are formed, and in the program area 70, a game program 72, an input-output controlling program 74, etc. are stored as shown in FIG. 13.

The game program 72 is a main software program for implementing the dowsing game by controlling the entire hardware (see FIG. 2) of the game apparatus 12 via the CPU 40. The game program 72 includes an image processing program 72*a* corresponding to the flowcharts in FIG. 20 to FIG. 22 as a sub software program. The image processing program 72*a* implements the image processing as described above in corporate with the input-output controlling program 74 under the control of the game program 72.

The input-output controlling program 74 controls an output of the game image depicted in the VRAM 42*d* mainly to the monitor 28 and an input of control data from the controller 14 (to the input area 92 described later) via the input-output processor 42*a* (through the output area 94 described later). Although illustration is omitted, the processing by the input-output controlling program 74 is simultaneously executed in parallel with the image processing in FIG. 20 to FIG. 22.

In the parameter area 76, surface height information 78 and object information 80 are stored. The surface height information 78 is information representing the height of the surface (Sf: see FIG. 14(A)) of the virtual space IS by using the Tg1, Tg2, . . . arranged on the reference level RL (height 0). In the tag Tg1, information indicating the center, the radius and the height is described, and in the tag Tg2, similar information is described. The circle areas A1 and A2 defined by such tags Tg1, Tg2 respectively correspond to the cliff C1 and the valley V1 in the virtual space IS in FIG. 10. The area A0 is a remaining area exclusive of the areas A1, A2, . . . from the reference level RL, and corresponds to the level ground LG in the virtual space IS in FIG. 10.

Here, the area defined by the tag may take a shape except for a circle, such as an oval figure, a polygon, etc. If a plurality of tags different in shape are combined, the surface Sf with more complex concaves/convexes can be represented. Furthermore, the surface height information 78 may be added to image data, such as a polygon, a texture, etc. independent of the tags.

The object information 80 is information describing the position (P1, P2, . . . ) and the kind (gold coins, items, animals, etc.), and a target flag indicating whether an object to be searched or not, with respect to each object (Ob1, Ob2, . . . ) arranged within the virtual space IS. Each of the target flags is turned off at an initial state, and switched between ON and OFF for each kind in response to an operation on the selection screen shown in FIG. 9. For example, in a case that three gold coins (Ob1 to Ob3) are hidden within the virtual space IS, when a gold coin is selected on the selection screen, the target flag of the objects Ob1 to Ob3 corresponding to each of the gold coins is switched from OFF to ON. Here, in a case that the basic detection range is set in correspondence with the attribute of the object to be detected (see step S20 in FIG. 21), the attribute (move/not move, for example) of each object Ob1, Ob2, . . . is also described.

In the variable area 82, referential position information 84, detection range information 86, object information 88 and positional relationship information 90 are stored. The referential position information 84 is information indicating the position and height (H) of the virtual camera IC (P) at this point as shown in FIG. 14(B). The virtual camera IC moves along the surface Sf (see FIG. 14) of the virtual space IS, and thus the height H changes among the heights $0$, H1, H2, . . . depending on which area A0, A1, A2, . . . the position P belongs to as shown in FIG. 14(A).

The detection range information 86 is information indicating a range capable of detection by dowsing at this point, and specifically represents a cone-shaped detection range DA taking the virtual camera IC as a base point as shown in FIG. 16(B). The detection range DA is defined by the threshold value dmax relating to the distance d and the threshold value θmax relating to the angle θ. In the threshold value dmax and θmax, the value corresponding to the height H of the virtual camera IC (=0, H1, H2) is set as shown in FIG. 15 (H1 is a positive value, H2 is a negative value, here). For example, 100 m and 15 degrees are set as values for normal when H=0, 1000 m and 20 degrees are set as values for long&wide when H=H1, and 20 m and 10 degrees are set as values for short&narrow when H=H2. Here, the extent of the detection range DA is changed in three levels, but it may be set in two levels or four or more levels. Also, the values of the threshold value dmax and θmax are merely one example and may suitably be changed.

The object information 88 is information indicating an object Obi to be dowsed at this point, that is, information indicating the object to which the sword Sw responds, and is represented by the distance (di) and the direction (θi) relating to the object Obi. During dowsing, in a case that a single object to be detected exists within the detection range DA, the single object to be detected is set to the object Obi, and in a case that a plurality of objects to be detected exist within the detection range DA, a top-priority object (see FIG. 16) decided based on the strength of the detection out of the plurality of objects to be detected is set. Here, in a case there is no object to be detected within the detection range DA, "null" is described.

The positional relationship information 90 is information indicating a manner of the pointer Pnt, specifically, indicating the color and the size of the prickle. The color and the size of the prickle change mainly in correspondence with the distance di (the detail is as described above) as shown in FIG. 17. Here, in the positional relationship information 90, information for controlling the position and the direction of the pointer Pnt (see FIG. 11 and FIG. 12) on the game screen is also added.

In an input area 92, controller data input from the controller 14 is stored. In an output area 94, game image data to be output to the monitor 28 through the VRAM 42d is stored.

Here, the aforementioned contents stored in the parameter area 76 are set at the beginning of dowsing. The contents stored in the variable area 82, the input area 92 and the output area 94 are initialized at the beginning of dowsing, and updated every frame (at a cycle of 1/60 sec. for example) during dowsing.

When the game program 72 is activated, the CPU 40 first executes initial processing in a step S1. In the initial processing, initialization of the VRAM 42d and generation of game image data are performed. After completion of the initial processing, the CPU 40 executes any one of loop processing of four kinds such as from step S3 through any one of steps S5, S11, S15 and S17 to the step S3 for each frame.

In the step S3, writing game image data to the output area 94 is performed. Immediately after the activation, the initial game image data generated in the step S1 is written. The game image data written to the output area 94 is transferred to the VRAM 42d under the control of the input-output controlling program 74, and a game image based thereon is displayed on the monitor 28.

In the step S5, it is determined whether or not controller data is input to the input area 92, and if "NO", the process returns to the step S3 to perform writing the game image data at a timing of a next frame. If "YES" in the step S5, the process proceeds to a step S7 to determine whether or not end instruction is included in the controller data. If "YES" in the step S7, the dowsing game is ended.

If "NO" in the step S7, the process proceeds to a step S9 to determine whether or not the current scene is a dowsing scene. Here, the information relating to the current scene is under the control of the game program 72, and for the determination in the step S9, the information is referred. If "NO" in the step S9, that is, if the current scene is a scene except for the dowsing scene, another image processing is executed in the step S11, and the process returns to the step S3 to repeat the processing similar to the above description. In the current step S3, the game image data after the image processing in the step S11 is written to the output area 94, and based thereon, the contents stored in the VRAM 42d and the contents displayed on the monitor 28 are updated.

If "YES" in the step S9, that is, if the current scene is a dowsing scene, the process proceeds to a step S13 to determine whether or not the object to be detected has already been selected, and if "NO" here, the process proceeds to the step S15. In the step S15, an object selecting screen is generated so as to be displayed on the game image. Thus, a game screen for selecting an object as shown in FIG. 9 is displayed on the monitor 28. On the game screen, eight icons Sh representing various objects, such as gold coins and items are depicted. Thereafter, the process returns to the step S3 to repeat the processing similar to the above description. The loop processing being made up of the steps S3 to S9, S13 and S15 is repetitively executed until any one of the icons is selected by the controller 14.

When an operation of selecting any one of the icons Sh is performed on the game screen in FIG. 9, the result of the selection is reflected on the controller data of the input area 92, and the determination result in the step S13 changes from "NO" to "YES". If "YES" in the step S13, it is determined whether or not this point in time is a start of the dowsing scene in a step S16a, and if "NO" here, the process proceeds to the step S17.

If "YES" in the step S16a, setting the parameters and initializing the variables are performed in a step S16b, and the results are written to the parameter area 76 as surface height information 78 and object information 80. The target flag included in the object information 80 is turned on as to the object (one or plurality) corresponding to the selected icon Sh (gold coin, for example), and is turned off as to the other objects. Then, the process proceeds to the step S17.

The in the step S17, dowsing image processing (see FIG. 21 and FIG. 22) is executed. Although the detailed description is made later, in the dowsing image processing, a series of processing of generating an image of the pointer Pnt indicating the result of the dowsing and depicting the generated pointer image (Pnt) on the game image is executed on the basis of the contents stored in the parameter area 76 and the variable area 82. Then, the process returns to the step S3 to repeat the processing similar to the above description.

Thus, the game screen shown in FIG. 10 to FIG. 12 is displayed on the monitor 28. On the game screen, the target object Obi is hidden underground, and the position P of the player character (virtual camera IC) which performs dowsing with the sword. Sw is moved in accordance with an operation with the controller 14. The pointer image (Pnt) on the game screen indicates the positional relationship between the player character (virtual camera IC) and the target object Obi (see FIG. 14(B)).

The loop processing being made up of the steps S3 to S9, S13, S16a, S16b and S17 is repetitively executed until end processing is performed by the controller 14 (or an end event, such as game over, etc. not shown occurs).

The dowsing image processing in the aforementioned step S17 is specifically executed according to the flowcharts shown in FIG. 21 and FIG. 22. Referring first to FIG. 21, in a step S21, it is determined whether or not the virtual camera IC moves on the basis of the controller data of the input area 92, and if "NO", the process proceeds to a step S29. If "YES" in the step S21, the referential position information 84 of the variable area 82 is updated in a step S23.

More specifically, first, the position P (see FIG. 14(B)) is updated to the latest value. Next, with reference to the surface height information 78, an area (any one of A0, A1, A2, . . . ) to which the updated position P belongs is specified, and the height corresponding to the result of the specification (H1 corresponding to A1, for example) is obtained, and the height H is updated by the obtained value. Accordingly, in this embodiment, the time when the height H described in the referential position information 84 changes is restricted to a case that the virtual camera IC moves over the border between the areas A0, A1, A2, . . . . Then, the process proceeds to a step S25.

In the step S25, it is determined whether or not the height H changes, and if "NO", the process proceeds to the step S29. If "YES" in the step S25, the detection range information 86 of the variable area 82 is updated in a step S27. More specifically, from among three different combinations (normal, long&wide, short&narrow), the dmax and the θmax (long&wide corresponding to H1, for example) corresponding to the height H as shown in FIG. 15 are selected, and the previously selected value described in the detection range information 86 is updated by the currently selected value. Then, the process proceeds to the step S29.

It should be noted that directly before the step S21, depending on the attribute of the object to be detected, a step S20 of adding the basic detection range may be added. The step S20 is executed once directly after the start of the dowsing image processing. Thereafter, the enlargement/reduction of the detection range DA in correspondence with the height H to be executed for every frame in a step S27 is executed by taking the basic detection range set in the step S20 as an initial value. In the object information 80 (see FIG. 13), an attribute of each of the objects Ob1, Ob2, . . . is further described, and the attribute described in the object information 80 is referred for setting. In the example shown in FIG. 13, the attribute of the object (Ob1, Ob2) for which the target flag is turned on is "not moving", and thus, the basic detection range is set to the normal.

In a step S29, it is determined whether or not an object to be detected (object for which the target flag is turned on) exists within the detection range DA on the basis of the object information 80, the referential position information 84 and the detection range information 86. If "NO" here, "white & absence of prickle" is written to the positional relationship information 90 in a step S31, and then, the process proceeds to a step S43.

If "YES" in the step S29, the process shifts to a step S33 to further determine whether or not an object to be detected existing within the detection range DA is a single, and if "YES", the process proceeds to a step S37. If "NO" in the step S33, the top-priority object is decided in a step S35, and the process proceeds to the step S37. The top-priority object deciding processing in the step S35 is executed according to the flowchart shown in FIG. 22, for example.

With reference to FIG. 22, in a first step S51, an initial value "1" is set to the variable i, and one object to be detected is selected from a plurality of objects to be detected. Next, in a step S53, it is determined whether or not the distance di to the selected object to be detected is a minimum value among the distances with the respective object to be detected. Then, if "YES" in the step S53, the process proceeds to a step S55 while if "NO", the process proceeds to a step S61.

In the step S55, it is further determined whether or not there is another object having the same distance di. If "YES" in the step S55, the process proceeds to a step S57 while if "NO", the process proceeds to a step S59.

In the step S57, it is further determined whether or not the angle θi of the selected object to be detected is larger than the angle of another object to be detected determined in the step S55. If "YES" in the step S57, the process proceeds to the step S61 while if "NO", the process proceeds to the step S59.

In the step S59, the object Obi is decided as a top-priority object, and then, the process returns to the hierarchical upper flowchart (see FIG. 21). In the step S61, the variable i is incremented, and then, the process returns to the step S53 to repeat the same processing similar to the above description. That is, the processing of selecting another object to be detected and determining whether the top-priority object or not is repeated.

Accordingly, as shown in FIG. 16, in a case that there are three objects to be detected (Ob1-Ob3) within the detection range DA, i=1 in the step S51, and then, it is determined whether or not the distance d1 is a minimum value out of d1 to d3 in the step S53. In the example in FIG. 16, d1=d2<d3, and the distance d1 is the minimum value, and therefore, the determination result in the step S53 is "YES". Thus, the process proceeds to the step S55 to next determine whether or not there is another object having the same value as d1.

In the example in FIG. 16, d1=d2, and therefore, the determination result in the step S55 is "YES". Thus, the process proceeds to the step S57 to further determine whether or not θ1 is larger than ƒ2. In FIG. 16 example, because θ1>θ2, the determination result in the step S57 is "YES". Thus, after i=2 in the step S61, the processing from the step S53 onward is executed.

Because d2=d1<d3, the determination result in the step S53 is also "YES" at this time, and the determination result in the step S55 is also "YES". However, because θ2<θ1, the determination result in the step S57 is "NO", and the object Ob2 is decided as a top-priority object.

Here, in FIG. 16 example, assuming that d1=d2<d3 and θ1=θ2, the determination result in the step S57 is "NO" at a time when i=1, and the object Obi is decided as a top-priority object. That is, the object checked first is a top-priority object.

Returning to FIG. 21, in the step S37, the object Obi (if only one object to be detected exists within the detection range DA, this is the single object, and if a plurality of objects to be detected exist, this is the top-priority object decided in the step S35), the distance di and the angle θi are written to the object information 88. In a next step S39, the strength of the detection as to the object Obi is calculated on the basis of the object information 88. Then, in a step S41, the color and the size of the prickle are calculated depending on the strength of the detection, and the result of the calculation is written to the positional relationship information 90. Then, the process proceeds to a step S43. Here, the strength of the detection and the calculation method of the color and the size of the prickle depending on the strength of the detection are described before and thus omitted here.

In the step S43, the pointer image (Pnt) is depicted on the game image on the basis of the positional relationship information 90. At this time, the depicting position of the pointer image (Pnt) (moreover, the position of the virtual camera IC) is controlled on the basis of the direction of the first controller 34. Furthermore, as to the direction of the pointer Pnt, the prickle is controlled to direct to this object Obi. These controls are not the main features of this embodiment, and thus detailed explanations are omitted. Thereafter, the process returns to the hierarchical upper flowchart (see FIG. 20). Thus, the game image data on which the depicting processing of the pointer image (Pnt) is performed is written to the output area 94 in the next step S3, and the game screen based thereon is displayed on the monitor 28.

As understood from the above description, in the game system 10 of this embodiment, the CPU 40 of the game apparatus 12 writes a game image obtained by imaging the virtual space IS where an object (object Obi) is arranged with the virtual camera IC into the output area 94 of the main memories 42e, 46 (S3), and depicts positional relationship information (image of the pointer Pnt) indicating a positional relationship between a predetermined referential position, for example, the position (P) of the virtual camera IC and the arrangement position (Pi) of the object on the game image stored in the output area 90 (S43). Then, the positional relationship information (Pnt) is changed in accordance with the conditions, such as the height H of the virtual camera IC from the reference level RL, and the attributes (moving/not moving) set to the object (S29, S31, S41). The positional relationship information is thus changed according to the conditions to thereby dynamically send a notice of the positional relationship information according to the situations of the referential position and the attributes of the object. Accordingly, it is possible to heighten the degree of flexibility of the game design.

Also, the CPU 40 sets the detection range DA (∂max, dmax) capable of detecting existence of the object, and changes the detection range DA depending on at least the height H (S20 to S27). The positional relationship information indicates at least whether or not the arrangement position of the object is within the range with respect to the referential position.

Furthermore, the detection range DA is set on the basis of the distance (dmax) from the referential position and the direction (θmax), and is enlarged as the value indicated by the height H is large (see FIG. 15).

Additionally, the positional relationship information indicates the strength of the detection of the object, and the detection range DA is divided into the plurality of areas (B1 to B3) such that the strength of the detection is changed step by step within the range.

Also, the CPU 40 calculates the strength of the detection on the basis of the distance (di) from the referential position to the arrangement position of the object and the direction (θi) (S39), and changes the positional relationship information on the basis of the calculation result in a case that the arrangement position of the object is within the range with respect to the referential position. Then, the calculation is performed as to the distance in preference to the direction. More specifically, the calculation is performed based on the distance, and if the distance is equal to each other, the direction is taken into consideration. However, there is no need of being restricted thereto, and the calculation may be performed in a calculating method of assigning weights to the distance rather than the direction, for example.

Also, in a case that a plurality of objects (Ob1, Ob2, . . . ) exist within the range, the CPU 40 decides the top-priority object (Obi) on the basis of the distance (d1, d2, . . . ) from the referential position to each object and the direction (θ1, θ2, . . . ) (S35). The positional relationship information indicates the relationship with the top-priority object. The decision is also performed by giving a high priority to the distance than to the direction. More specifically, the decision is performed based on the distance, and if the distance is equal to each other, the direction is taken into consideration. There is no need of being restricted thereto, and the decision may be performed according to the algorithm of assigning weights to the distance rather than the direction, for example.

The detection range DA is also enlarged when the object moves (S20). It is preferable that it is more enlarged as the object is an object moving larger (faster). In the attribute, the information relating to a size is included, and if the size of the object is large, the detection range DA is enlarged so as to make it easy to find the object. It is preferable that as the object is larger in size, the detection range DA is enlarged. In the attribute, the information relating to rarity is included, and in a case that the rarity of the object is high, the range may be reduced to make it difficult to find the object. More preferably, the range is made narrow as the object is an object high in rarity.

Furthermore, each modified example described below is also possible.

The detection range DA changes depending on the height H of the virtual camera IC, that is, the local height (H1, H2, . . . ) of the surface Sf in this embodiment (see FIG. 14(A)), but this may be changed over the entire area (stage) without being restricted thereto. For example, in the area of the sky or the sea, the detection range DA is set so as to be larger than that in the ground area to make it easy to search for an object even in the wide area.

The detection range DA is set with reference to the virtual camera IC, but may be set with reference to the sword Sw.

The distance di from the virtual camera IC to the object Obi is represented by a distance component along the optical axis direction, but may be represented by the length of the line segment connecting both of them.

The local height H1, H2, . . . of the surface Sf is described in the surface height information 78 in association with the tags Tg1, Tg2, . . . (see FIG. 13, FIG. 14(A)) arranged in the map (reference level RL) but may be imbedded in the game image data (polygon data texture data, for example). Or, the map is divided into a plurality of areas to each of which the height may be set.

In the above description, the game apparatus 12 executing the game processing and the game system 10 including it are described, but these example embodiments of invention may also be applied to other image processing apparatuses or image processing systems in addition to other game apparatuses or game systems. In the game system or the image processing system, image processing may distributedly be performed by a plurality of computers, etc.

Although example embodiments of the present invention has been described and illustrated in detail, it is clearly understood that the same is by way of illustration and example only and is not to be taken by way of limitation, the spirit and scope of the present invention being limited only by the terms of the appended claims.

Furthermore, it should be understood that overall the embodiment of the present invention, a representation of a singular form also includes a concept of the plural form unless otherwise stated. Accordingly, an article or an adjective in the singular (for example, "a", "an", "the", etc. for English) also includes a concept of the plural form unless otherwise stated.

What is claimed is:

1. A non-transitory storage medium storing an image processing program, wherein
    said image processing program causes a computer of an image processing apparatus to provide functionality comprising:
    outputting a virtual space image obtained by imaging a virtual space in which at least one object is arranged with a virtual camera;
    notifying positional relationship information indicating a positional relationship between a predetermined referential position within said virtual space and an arrangement position of said object within said virtual space; and
    setting a detection range of said object in the virtual space, the detection range based on at least height information defining a height of the predetermined referential position in the virtual space from a reference level in the virtual space.

2. The non-transitory storage medium storing an image processing program according to claim 1, wherein
    said positional relationship information is information at least indicating whether or not the arrangement position of said object is within said detection range.

3. The non-transitory storage medium storing an image processing program according to claim 2, wherein
    said detection range is enlarged as a value indicated by said height information is large.

4. The non-transitory storage medium storing an image processing program according to claim 2, wherein
    said detection range is set on the basis of a distance and a direction from said predetermined referential position.

5. The non-transitory storage medium storing an image processing program according to claim 4, wherein
    said positional relationship information includes information indicating strength of detection of said object, and
    said detection range is divided into a plurality of areas so as to change the strength of the detection step by step within said detection range.

6. The non-transitory storage medium storing an image processing program according to claim 5, wherein
    said image processing program causes said computer to provide further functionality comprising:
    calculating the strength of the detection on the basis of the distance from said predetermined referential position to the arrangement position of said object and the direction, and
    changing said positional relationship information on the basis of the calculated strength of the detection in a case that the arrangement position of said object is within said detection range.

7. The non-transitory storage medium storing an image processing program according to claim 6, wherein
    the calculation is made by giving a higher priority to the distance than to the direction.

8. The non-transitory storage medium storing an image processing program according to claim 2, wherein
    said image processing program causes said computer to provide further functionality comprising:
    deciding a top-priority object on the basis of the distance from said predetermined referential position to each object and the direction in a case that a plurality of objects exist within said detection range, and
    said object is said top-priority object.

9. The non-transitory storage medium storing an image processing program according to claim 8, wherein
    a decision is made on deciding the top-priority object by giving a higher priority to the distance than to the direction.

10. The non-transitory storage medium storing an image processing program according to claim 2, wherein
    said height information belongs to an attribute set to said object.

11. The non-transitory storage medium storing an image processing program according to claim 10, wherein
    said attribute set includes information indicating whether or not said object is a movable object.

12. The non-transitory storage medium storing an image processing program according to claim 1, wherein
    the positional relationship information is represented by at least one of an image, a voice, vibrations or light emission.

13. The non-transitory storage medium storing an image processing program according to claim 12, wherein
    the positional relationship information is depicted as being indicated by the image on said virtual space image.

14. The non-transitory storage medium storing an image processing program according to claim 13, wherein
    the image representing the positional relationship information is controlled so as to be directed to said object.

15. The non-transitory storage medium storing an image processing program according to claim 12, wherein
    said image processing program causes said computer to provide further functionality comprising controlling the position of said virtual camera on the basis of an input from a pointing device.

16. An image processing apparatus, comprising a processor system for:
    outputting a virtual space image obtained by imaging a virtual space in which at least one object is arranged with a virtual camera;
    notifying positional relationship information indicating a positional relationship between a predetermined referential position within said virtual space and an arrangement position of said object within said virtual space; and setting a detection range of said object in the virtual space, the detection range based on at least height information defining a height of the predetermined referential position in the virtual space from a reference level in the virtual space.

17. The image processing apparatus according to claim 16, wherein
said positional relationship information is information at least indicating whether or not the arrangement position of said object is within said detection range.

18. An image processing method to be executed by an image processing apparatus, including:
outputting a virtual space image obtained by imaging a virtual space in which at least one object is arranged with a virtual camera;
notifying positional relationship information indicating a positional relationship between a predetermined referential position within said virtual space and an arrangement position of said object within said virtual space; and
setting a detection range of said object in the virtual space, the detection range based on at least height information defining a height of the predetermined referential position in the virtual space from a reference level in the virtual space.

19. The image processing method according to claim 18, wherein
said positional relationship information is information at least indicating whether or not the arrangement position of said object is within said detection range.

20. An image processing system, comprising:
a computer system, including at least one computer processor, the computer system being configured to:
output a virtual space image obtained by imaging a virtual space in which at least one object is arranged with a virtual camera;
notify positional relationship information indicating a positional relationship between a predetermined referential position within said virtual space and an arrangement position of said object within said virtual space; and
set a detection range of said object in the virtual space, the detection range based on at least height information defining a height of the predetermined referential position in the virtual space from a reference level in the virtual space.

21. The image processing system according to claim 20, wherein
said positional relationship information is information at least indicating whether or not the arrangement position of said object is within said detection range.

22. An image processing system comprising:
a computer system, including at least one computer processor, the computer system at least being configured to:
output a virtual space image obtained by imaging a virtual space in which at least one object is arranged with a virtual camera;
notify positional relationship information indicating a positional relationship between a predetermined referential position within said virtual space and an arrangement position of said object within said virtual space; and
set a detection range of said object in the virtual space, the detection range based on at least height information defining a height of the predetermined referential position in the virtual space from a fixed reference level in the virtual space.

23. The image processing system according to claim 22, wherein
said positional relationship information is information at least indicating whether or not the arrangement position of said object is within said detection range.

* * * * *